United States Patent
Sato

(10) Patent No.: US 11,244,210 B2
(45) Date of Patent: Feb. 8, 2022

(54) NON-TRANSITORY COMPUTER-READABLE RECORDING MEDIUM STORING COMPUTER-READABLE INSTRUCTIONS FOR INFORMATION PROCESSING DEVICE AND INFORMATION PROCESSING DEVICE FOR MANAGEMENT OF COLORANT MATERIAL AMOUNTS IN PLURAL TYPES OF PRINTERS HAVING DIFFERENT METHODS FOR SUPPLYING COLORANT MATERIALS

(71) Applicant: BROTHER KOGYO KABUSHIKI KAISHA, Nagoya (JP)

(72) Inventor: Yutaro Sato, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 16/827,961

(22) Filed: Mar. 24, 2020

(65) Prior Publication Data

US 2020/0311494 A1    Oct. 1, 2020

(30) Foreign Application Priority Data

Mar. 28, 2019    (JP) .............................. JP2019-064085

(51) Int. Cl.
*G06K 15/02* (2006.01)
*G06F 3/12* (2006.01)
*G06K 15/00* (2006.01)

(52) U.S. Cl.
CPC ....... *G06K 15/005* (2013.01); *G06K 15/4075* (2013.01)

(58) Field of Classification Search
None
See application file for complete search history.

(56) References Cited

U.S. PATENT DOCUMENTS

| 2003/0231331 | A1  | 12/2003 | Tanaka |
| 2018/0349835 | A1* | 12/2018 | Ishida ................. G06Q 10/087 |
| 2019/0163413 | A1* | 5/2019  | Suzuki ................. G06F 3/1259 |
| 2019/0291488 | A1* | 9/2019  | Mizuno ............... B41J 2/17546 |
| 2019/0346800 | A1* | 11/2019 | Nogawa ............... G06F 3/1219 |
| 2020/0338900 | A1* | 10/2020 | Morikawa ............ B41J 2/17523 |

FOREIGN PATENT DOCUMENTS

| JP | 2004-005088 A | 1/2004 |
| JP | 2013159070    | * 8/2013 ................ B41J 2/01 |

* cited by examiner

*Primary Examiner* — Beniyam Menberu
(74) *Attorney, Agent, or Firm* — Scully, Scott, Murphy & Presser, P.C.

(57) ABSTRACT

An information processing device may display a first remaining amount object having a first display manner in a case where a remaining amount of colorant in a first cartridge of a first-type printer comprising a tank is greater than zero, displays the first remaining amount object having a second display manner in a case where the remaining amount of colorant in the first cartridge is zero and a remaining amount of colorant in the tank is greater than an unprintable remaining amount, displays a second remaining amount object having a first display manner in a case where a remaining amount of colorant in a second cartridge of a second-type printer is greater than an unprintable remaining amount, and displays the second remaining amount object having a second display manner in a case where the remaining amount of colorant in the second cartridge is the unprintable remaining amount.

20 Claims, 14 Drawing Sheets

FIG. 5

Management Database 40

| Printer Model Name | Model Name | Ink Supply Model | Number of Total Sheets TO | Number of Tank Sheets TA | Number of Remaining Sheets RE | CTG Remaining Rate | Tank Remaining Rate |
|---|---|---|---|---|---|---|---|
| Pa | Ma | sub tank | TOa | TAa | REa | 55 | 100 |
| Pb | Mb | sub tank | TOb | TAb | REb | 0 | 0 |
| Pc | Mc | CTG | TOc | – | REc | 10 | – |
| Pd | Md | CTG | TOd | – | REd | 70 | – |
| ... | ... | ... | ... | ... | ... | ... | ... |

· Tank Remaining Rate of Sub-tank Model
(Case where RE > TA)
100
(Case where RE ≦ TA)
100 × RE / TA · CTG Remaining Rate of Sub-tank Model
(Case where RE > TA)
100 × (RE − TA) / (TO − TA)
(Case where RE ≦ TA)
0

· CTG Remaining Rate of CTG Model
100 × RE / TO (Case A)
Printer 100a: Tank Remaining Rate 100%, CTG Remaining Rate 70%
Printer 100b: Tank Remaining Rate 100%, CTG Remaining Rate 60%
Printer 100c: CTG Remaining Rate 70%
Printer 100d: CTG Remaining Rate 60%

FIG. 12
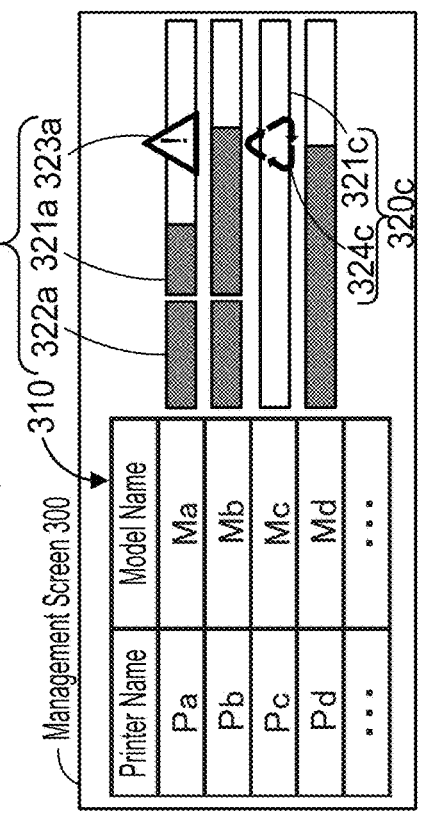
(Case C1)
Printer 100a: Tank Remaining Rate 100%, CTG Remaining Rate 0%
Printer 100b: Tank Remaining Rate 100%, CTG Remaining Rate 60%
Printer 100c: CTG Remaining Rate 20%
Printer 100d: CTG Remaining Rate 60%
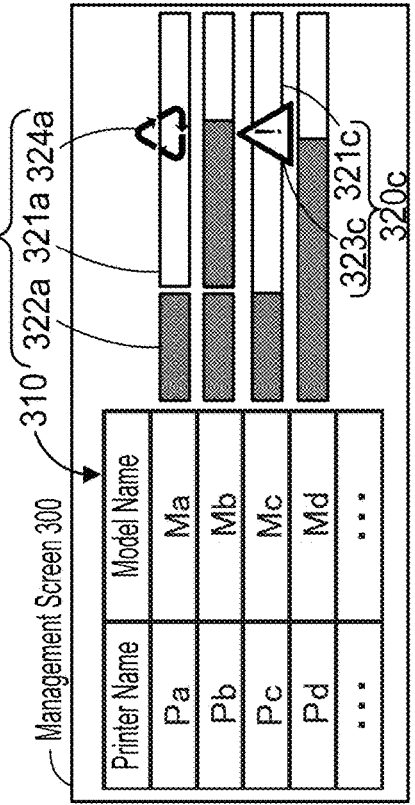
(Case C2)
Printer 100a: Tank Remaining Rate 100%, CTG Remaining Rate 20%
Printer 100b: Tank Remaining Rate 100%, CTG Remaining Rate 60%
Printer 100c: CTG Remaining Rate 0%
Printer 100d: CTG Remaining Rate 60%
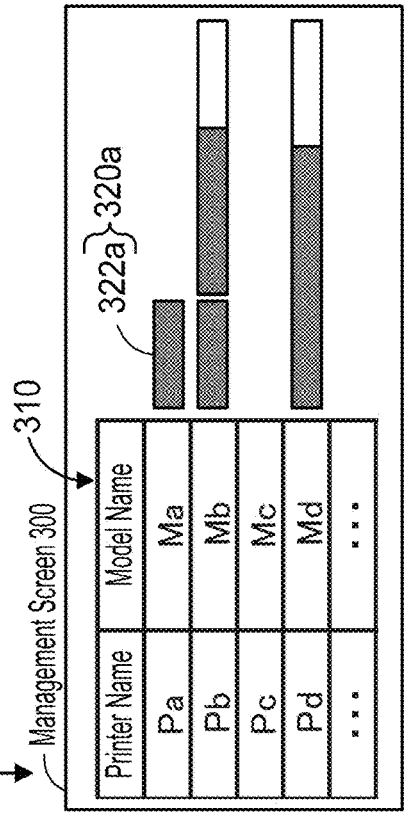

NON-TRANSITORY COMPUTER-READABLE RECORDING MEDIUM STORING COMPUTER-READABLE INSTRUCTIONS FOR INFORMATION PROCESSING DEVICE AND INFORMATION PROCESSING DEVICE FOR MANAGEMENT OF COLORANT MATERIAL AMOUNTS IN PLURAL TYPES OF PRINTERS HAVING DIFFERENT METHODS FOR SUPPLYING COLORANT MATERIALS

CROSS-REFERENCE TO RELATED APPLICATION

This application claims priority to Japanese Patent Application No. 2019-064085, filed on Mar. 28, 2019, the entire contents of which are incorporated herein by reference.

TECHNICAL FIELD

The present specification discloses a technique relating to an information processing device configured to acquire remaining amount information related to a remaining amount of colorant in a printer.

BACKGROUND

An image forming device is known that displays a display screen including a gauge showing a remaining amount of toner in a small-capacity cartridge, and a gauge showing a remaining amount of toner in a large-capacity cartridge.

SUMMARY

In the aforementioned technique, there is no assumption that a plurality of types of printers which have different methods for supplying toner to a developing means exist.

The present specification provides a technique for improving user convenience when, in a situation where first-type and second-type printers that have different methods for supplying a colorant from a cartridge to a print executing unit exist, a screen is displayed showing a remaining amount of colorant in each of the first-type printer and second-type printer.

A non-transitory computer-readable recording medium storing computer-readable instructions for an information processing device is disclosed. The computer-readable instructions, when executed by a processor of the information processing device, may cause the information processing device to: acquire first remaining amount information related to a remaining amount of colorant in a first-type printer from the first-type printer, wherein the first-type printer comprises a first print executing unit and a tank configured to store colorant supplied from a first cartridge to the first print executing unit; acquire second remaining amount information related to a remaining amount of colorant in a second-type printer from the second-type printer different from the first-type printer, wherein the second-type printer comprises a second print executing unit and does not comprise a tank configured to store colorant supplied from a second cartridge to the second print executing unit, and each of the first-type printer and the second-type printer shills from a printable state to an unprintable state in a case where the remaining amount of colorant in the printer reaches an unprintable remaining amount; and display a remaining amount screen on a display unit of the information processing device using the acquired first remaining amount information and the acquired second remaining amount information, wherein the remaining amount screen includes a first remaining amount object which indicates the remaining amount of colorant in the first-type printer, and a second remaining amount object which indicates the remaining amount of colorant in the second-type printer, wherein the first remaining amount object includes a first cartridge object having a band shape which indicates a remaining amount of colorant in the first cartridge, and a tank object having a band shape which indicates a remaining amount of colorant in the tank, the second remaining amount object includes a second cartridge object having a band shape which indicates a remaining amount of colorant in the second cartridge, the first remaining amount object having a first display manner is displayed in a case where the acquired first remaining amount information indicates that the remaining amount of colorant in the first cartridge is greater than zero, the first remaining amount object having a second display manner different from the first display manner is displayed in a case where the acquired first remaining amount information indicates that the remaining amount of colorant in the first cartridge is zero and the remaining amount of colorant in the tank is greater than the unprintable remaining amount, the second remaining amount object having the first display manner is displayed in a case where the acquired second remaining amount information indicates that the remaining amount of colorant in the second cartridge is greater than the unprintable remaining amount, and the second remaining amount object having the second display manner is displayed in a case where the acquired second remaining amount information indicates that the remaining amount of colorant in the second cartridge is the unprintable remaining amount.

According to another non-transitory computer-readable recording medium storing computer-readable instructions, the first remaining amount object having a first display manner may be displayed in a case where the acquired first remaining amount information indicates that the remaining amount of colorant in the first cartridge is greater than a first remaining amount, the first remaining amount object having a third display manner different from the first display manner may be displayed in a case where the acquired first remaining amount information indicates that the remaining amount of colorant in the first cartridge is equal to or less than the first remaining amount and is greater than zero, the second remaining amount object having the first display manner may be displayed in a case where the acquired second remaining amount information indicates that the remaining amount of colorant in the second cartridge is greater than a second remaining amount, and the second remaining amount object having the third display manner may be displayed in a case where the acquired second remaining amount information indicates that the remaining amount of colorant in the second cartridge is equal to or less than the second remaining amount and is greater than the unprintable remaining amount.

An information processing device realized by the above computer-readable instructions, and a method executed by the information processing device are also novel and useful. Further, a system comprising the information processing device and the first-type and second-type printers is also novel and useful.

BRIEF DESCRIPTION OF DRAWINGS

FIG. 5 shows an example of a management database:

FIG. 12 shows cases C1 and C2 in which one remaining amount object is displayed in the slow-blinking manner, and one remaining amount object is displayed in a fast-blinking manner;

Figure 1:
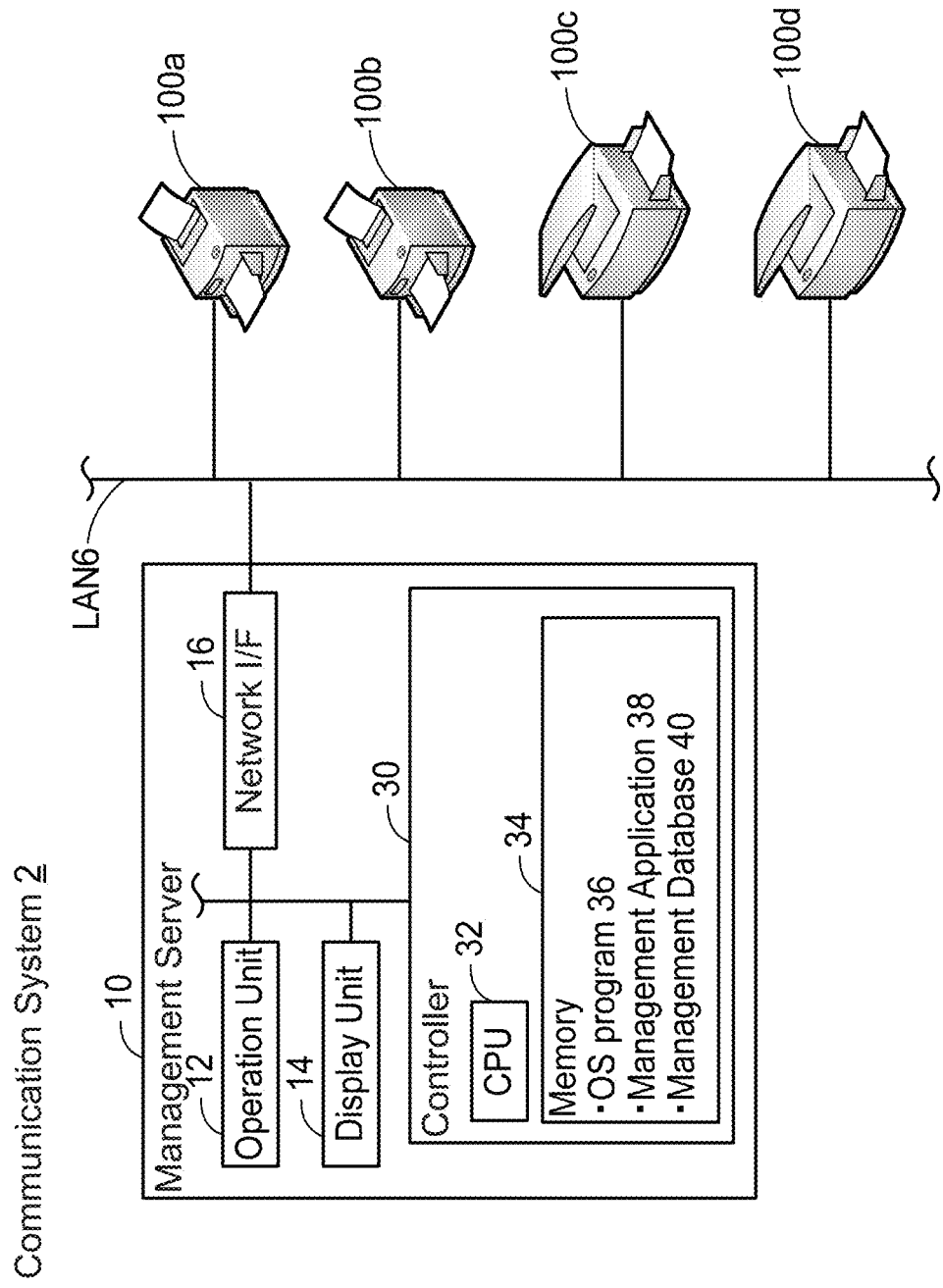
FIG. 1 shows a configuration of a communication system.

DETAILED DESCRIPTION (Configuration of Communication System 2: FIG. 1)

As shown in FIG. 1, a communication system 2 comprises a management server 10 and a plurality of printers 100a to 100d. The management server 10 and the printers 100a, etc. are connected to a LAN (Local Area Network) 6, and are capable of communicating with one another via the LAN 6. The LAN 6 may be a wired LAN or a wireless LAN.

(Configuration of Management Server 10)

The management server 10 acquires information from each of the printers 100a, etc. and manages these information. In particular, the management server 10 has a function of displaying remaining amount objects indicating amounts of ink remaining in the printers 100a, etc. The management server 10 comprises an operation unit 12, a display unit 14, a network interface 16, and a controller 30.

The operation unit 12 comprises a keyboard and a mouse operated by a user. The display unit 14 is a display for displaying various types of information. The network interface 16 is connected to the LAN 6. The LAN 6 may be a wireless LAN, or may be a wired LAN. The controller 30 comprises a CPU 32 and a memory 34. The CPU 32 executes various processes in accordance with programs 36, 38 stored in the memory 34. The memory 34 is constituted of a volatile memory, a non-volatile memory, and the like.

The OS program 36 is a program for realizing basic processes of the management server 10. The management application 38 is a program for acquiring printer information related to each printer of the plurality of printers 100a to 100d from the printers 100a to 100d, and executing processing using the printer information. The management application 38 is. e.g., installed on the management server 10 from a medium shipped together with each of the printers 100a, etc. The memory 34 further comprises a management database 40. Contents of the management database 40 will be described later. Below, the management database 40 is termed "management DB 40".

(Configuration of Printers 100a to 100d (FIG. 2))

The printers 100a to 100d are each a peripheral device (that is, a peripheral device of a PC for example, not shown) capable of executing a print function. The printers 100a, etc. may each be a multi-function peripheral capable of executing a scan function, copy function. FAX function, etc. in addition to the print function.

Figure 2:
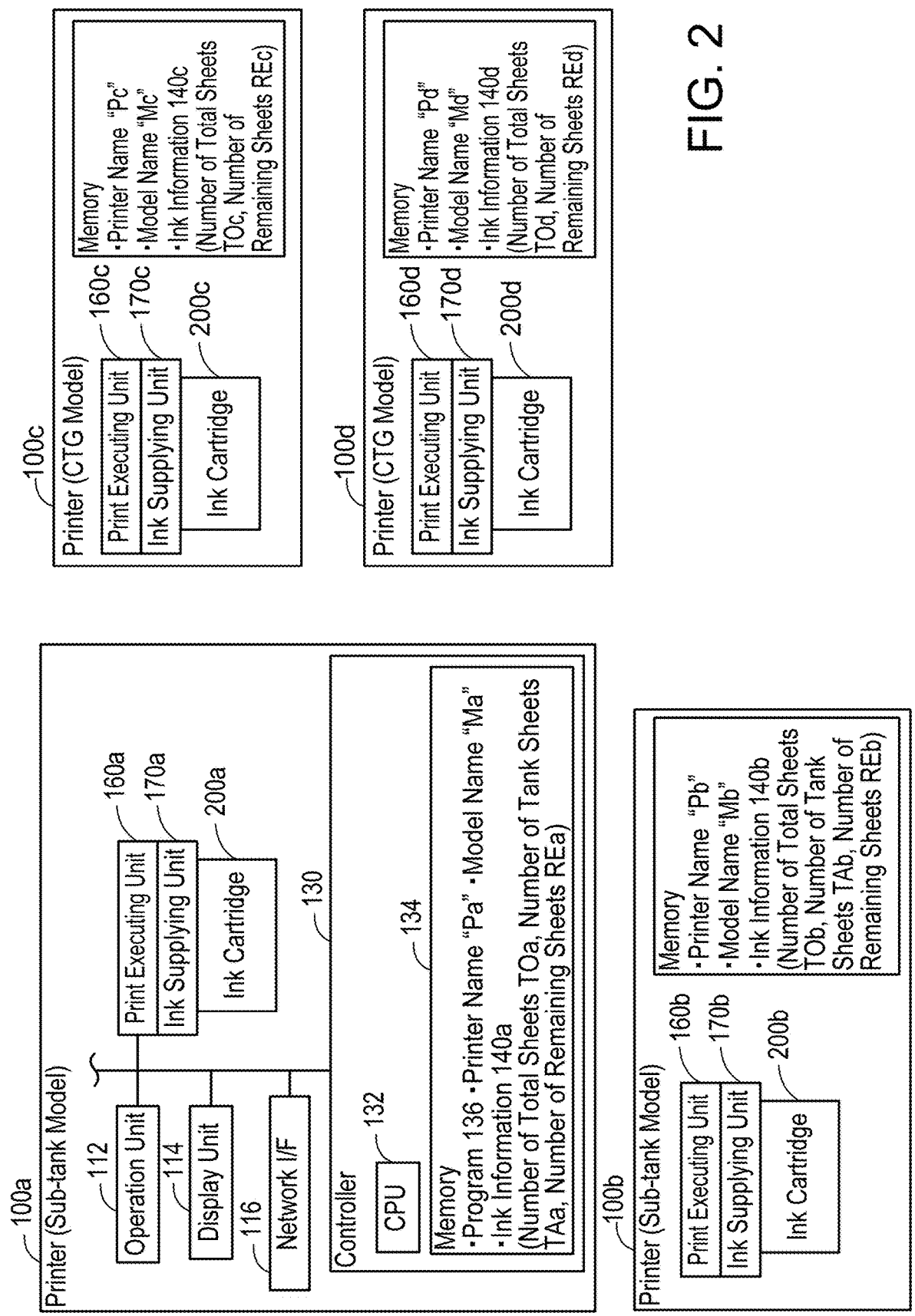
FIG. 2 shows configurations of printers.

As shown in FIG. 2, the printer 100a comprises an operation unit 112, a display unit 114, a network interface 116, a controller 130, a print executing unit 160a, and an ink supplying unit 170a.

The operation unit 112 comprises a plurality of keys to be operated by the user. The display unit 114 is a display for displaying various types of information. The network interface 116 is connected to the LAN 6. The controller 130 comprises a CPU 132 and a memory 134. The CPU 132 executes various processes in accordance with a program 136 stored in the memory 134. The memory 134 is constituted of a volatile memory, a non-volatile memory, and the like. The print executing unit 160a comprises an ink jet scheme printing mechanism. In the present embodiment, the print executing unit 160a is a monochrome printing mechanism that executes printing using one color of ink (e.g., black (K)). An ink cartridge 200a is mounted in the ink supplying unit 170a. The ink supplying unit 170a supplies the ink from the ink cartridge 200a to the print executing unit 160a. Below, ink cartridge may be termed "CTG (Cartridge)".

The memory 134 further stores a printer name "Pa", a model name "Ma", and ink information 140a. The printer name "Pa" is a name assigned to the printer 100a. The model name "Ma" is a name indicating a model of the printer 100a. The ink information 140a is information related to a remaining ink amount in the printer 100a, and includes a number of total sheets TOa, a number of tank sheets TAa, and a number of remaining sheets REa. Contents of the ink information 140a will be described later.

In FIG. 2, some components (e.g., operation unit, display unit etc.) of the other printers 100b to 100d are not shown. The printer 100b comprises a same configuration as the printer 100a. The printer 100b comprises a print executing unit 160b, an ink supplying unit 170b in which a CTG 200b is mounted, and a memory in a controller (reference number omitted). The memory stores a printer name "Pb", a model name "Mb", and ink information 140b. As with the ink information 140a of the printer 100a, the ink information 140b includes a number of total sheets TOb, a number of tank sheets TAb, and a number of remaining sheets REb.

The printers 100c. 100d each comprise the same configuration as the printer 100a except for respectively comprising ink supplying units 170c. 170d different from the ink supplying unit 170a of the printer 100a. The printer 100c comprises a print executing unit 160c, an ink supplying unit 170c in which a CTG 200c is mounted, and a memory in a controller (reference number omitted). The memory stores a printer name "Pc", a model name "Mc", and ink information 140c. The ink information 140c includes a number of total sheets TOc, and a number of remaining sheets REc, but does not include a number of tank sheets. Further, the printer 100d comprises a print executing unit 160d, an ink supplying unit 170d in which a CTG 200d is mounted, and a memory in a controller (reference number omitted). The memory stores a printer name "Pd", a model name "Md", and ink information 140d. The ink information 140d includes a number of total sheets TOd. and a number of remaining sheets REd, but does not include a number of tank sheets.

Figure 3A:
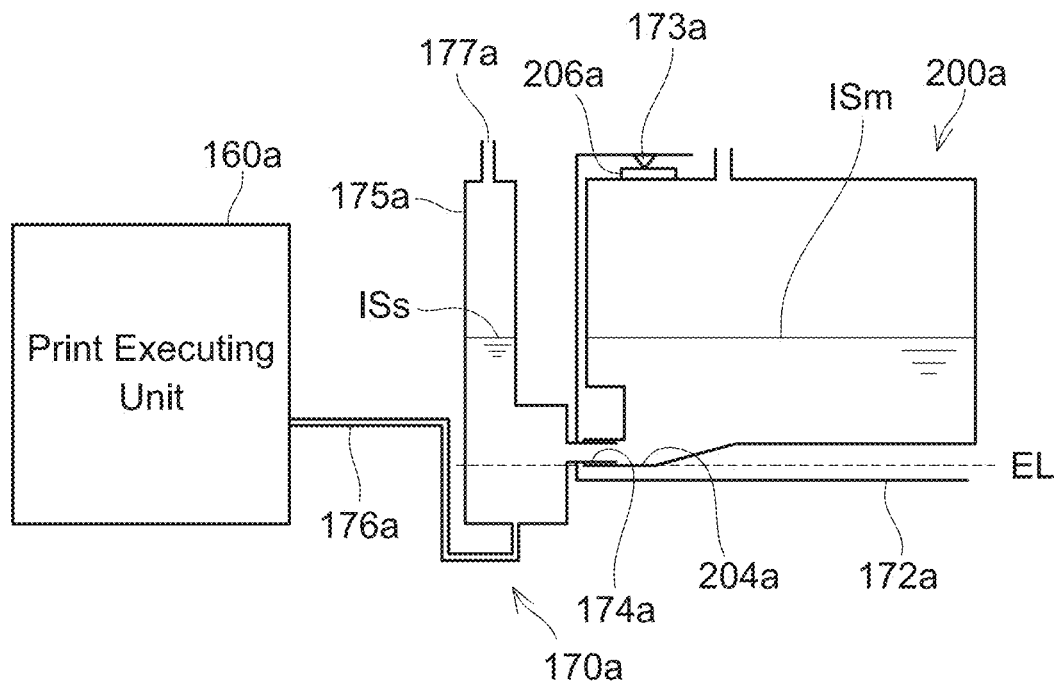
FIG. 3A shows a configuration of an ink supplying unit of a sub-tank model printer.
Figure 3B:
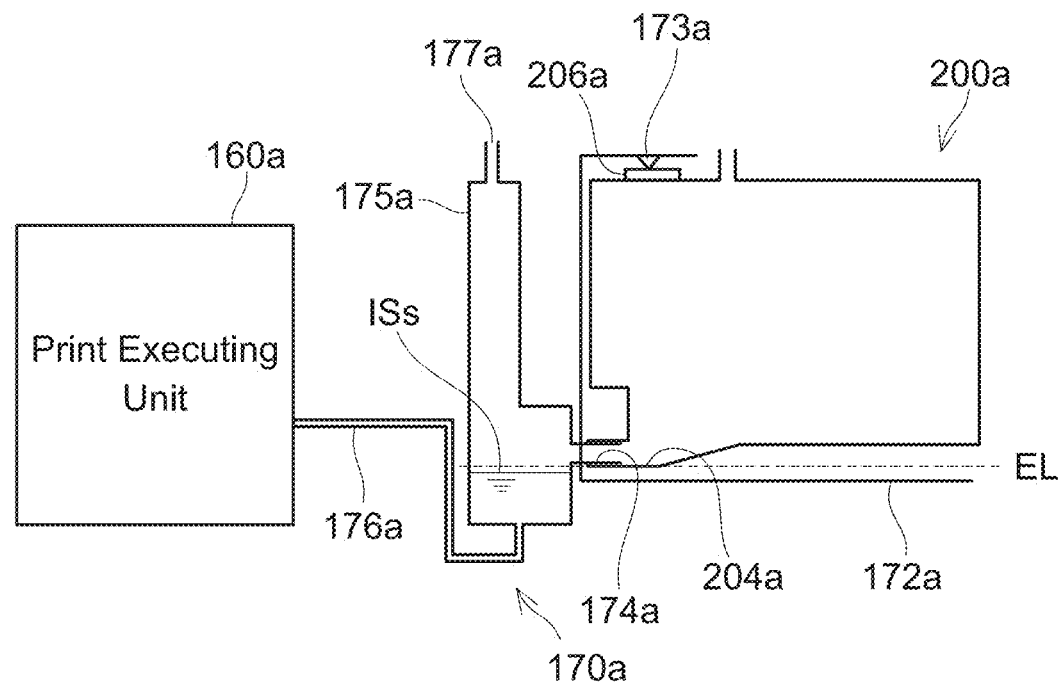
FIG. 3B shows a configuration of an ink supplying unit of a sub-tank model printer.

(Configuration of Ink Supplying Unit 170a of Printer 100a; FIG. 3A and FIG. 3B)

Next, a configuration of the ink supplying unit 170a of the printer 100a will be described with reference to FIG. 3A and FIG. 3B. As shown in FIG. 3A, the ink supplying unit 170a comprises an installment part 172a, an ink supply port 174a, a sub-tank 175a, and an ink flow path 176a.

The installment part 172a is a holder to which the CTG 200a is removably mounted. The ink supply port 174a is connected to an ink outlet port 204a of the CTG 200a mounted on the installment part 172a. The ink outlet port 204a is provided near a bottom surface of the CTG 200a. The sub-tank 175a stores ink supplied from the CTG 200a to the print executing unit 160a. The sub-tank 175a comprises a communication port 177a provided at an upper surface of the sub-tank 175a. The communication port 177a communicates between an interior and an exterior of the sub-tank 175a. One end of the ink flow path 176a is connected with the sub-tank 175a at a bottom surface of the sub-tank 175a. Another end of the ink flow path 176a is connected with the print executing unit 160a.

Since the ink supplying unit 170a comprises the above configuration, ink within the CTG 200a is supplied to the sub-tank 175a via the ink outlet port 204a and the ink supply port 174a. Then, the ink within the sub-tank 175a is supplied to the print executing unit 160a via the ink flow path 176a. Below, a printer (e.g., 100a) comprising this type of sub-tank (e.g., 175a) is called a "sub-tank model printer". Further, a printer not comprising a sub-tank is called a "cartridge model (i.e., CTG model) printer".

When a new CTG 200a is mounted in the installment part 172a, a part of the ink in the CTG 200a moves into the sub-tank 175a. Then, a height of a liquid level ISm of the ink in the CTG 200a matches a height of a liquid level ISs of the ink in the sub-tank 175a (see FIG. 3A). Thereafter, when ink is consumed by printing being executed by the print executing unit 160a, the liquid levels ISm. ISs fall while the liquid levels ISm. ISs maintain a matching height. Then, when the liquid levels ISm. ISs reach a position EL (hereinbelow termed "empty level EL") at a lower end of the CTG 200a, the ink in the CTG 200a reaches a non-remaining state (see FIG. 3B). Here, the ink in the CTG 200a being in the non-remaining state means a state in which there is no longer movement of ink from the CTG 200a to the sub-tank 175a, and includes a state in which some ink adheres to an inner surface of the CTG 200a. In the sub-tank model printer 100a, the CTG 200a can be replaced when the ink in the CTG 200a is in the non-remaining state, therefore ink is not wasted.

In a case where ink is remaining in the sub-tank 175a although ink is not remaining in the CTG 200a, the print executing unit 160a can continue printing. Then, when the ink in the sub-tank 175a reaches a non-remaining state without the CTG 200a being replaced, the printer 100a shifts from a printable state to an unprintable state.

Further, the installment part 172a comprises a contact point 173a that makes contact with an IC chip 206a of the CTG 200a. The CPU 132 of the printer 100a is able to read information in the IC chip 206a via the contact point 173a. This information includes the number of total sheets TOa. The number of total sheets TOa is a number of sheets of print material that can be printed using the ink amount stored in a new CTG 200a (hereinbelow termed "initial amount"). The number of total sheets TOa is obtained by dividing the initial amount by a unit ink amount. The unit ink amount is an average ink amount used for printing one sheet of print material.

Here, the ink amount in the sub-tank 175a when shifting from the state of FIG. 3 A to the state of FIG. 3B is called "a boundary ink amount". That is, the boundary ink amount is the ink amount in the sub-tank 175a when the liquid level ISm of the ink in the CTG 200a reaches the empty level EL. In other words, the boundary ink amount is a maximum ink amount that can be stored in the sub-tank 175a when the ink in the CTG 200a is zero. Further, hereinbelow, the number of sheets of print material that can be printed using the boundary ink amount is called "a number of tank sheets". The boundary ink amount and the number of tank sheets depend on structure and size of the sub-tank. The number of tank sheets TAa of the printer 100a is obtained by dividing the boundary ink amount of the printer 100a by the unit ink amount.

As described above, upon reading the number of total sheets TOa from the CTG 200a, the CPU 132 of the printer 100a stores the number of total sheets TOa in the memory 134 (see FIG. 2). Further, the memory 134 of the printer 100a stores the number of tank sheets TAa in advance (see FIG. 2). Further, the number of remaining sheets REa stored in the memory 134 (see FIG. 2) is the number of sheets of print material that can be printed using the ink remaining in the CTG 200a and the sub-tank 175a, and is obtained by subtracting a cumulative number of printed sheets from the number of total sheets TOa. The cumulative number of printed sheets is the number of sheets of print material for which printing was executed after replacement of the CTG 200a. Each time printing is executed by the print executing unit 160a, the CPU 132 calculates a new number of remaining sheets REa by subtracting the cumulative number of printed sheets from the number of total sheets TOa. and stores the new number of remaining sheets REa in the memory 134 in place of the old number of remaining sheets REa.

(Configuration of Ink Supplying Unit 170b of Printer 100b)

The printer 100b, like the printer 100a, is a sub-tank model printer. The ink supplying unit 170b of the printer 100b is the same as the ink supplying unit 170a of the printer 100a. Further, a size of an interior space of the CTG 200b that can be mounted in the ink supplying unit 170b is the same as a size of an interior space of the CTG 200a. Consequently, the initial amount of ink in the CTG 200b is the same as the initial amount of ink in the CTG 200a. For this reason, the number of total sheets TOb (see FIG. 2) of the printer 100b is the same as the number of total sheets TOa of the printer 100a. Further, the number of tank sheets TAb (see FIG. 2) of the printer 100b is the same as the number of tank sheets TAa of the printer 100a. However, the number of total sheets TOb may be a value different from the number of total sheets TOa. and the number of tank sheets TAb may be a value different from the number of tank sheets TAa.

Figure 4A:
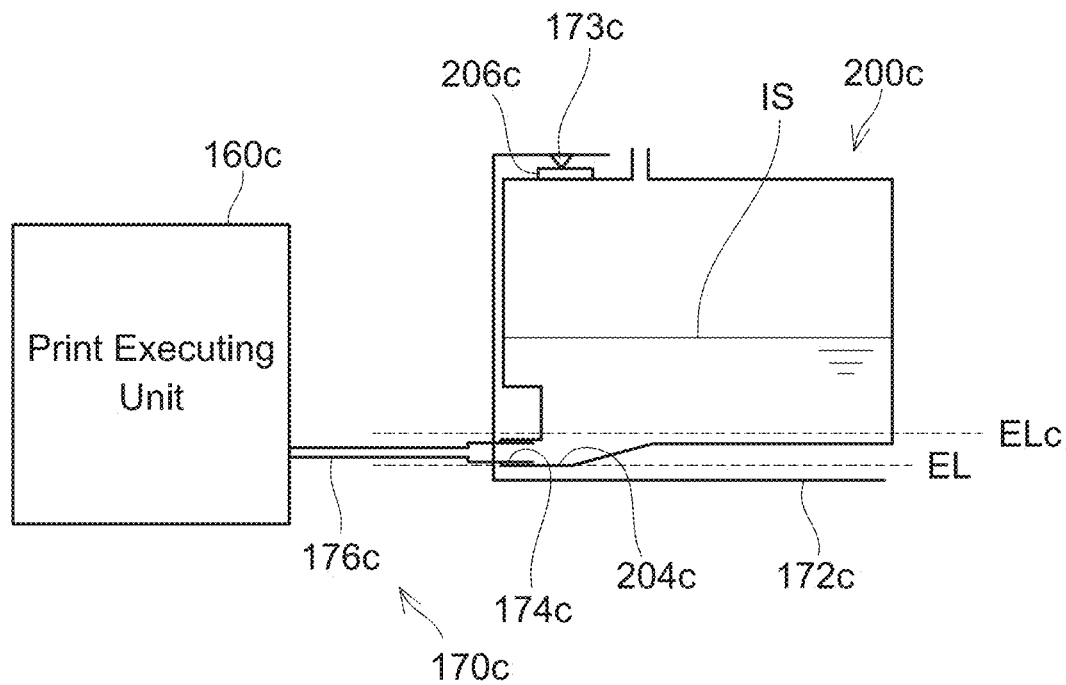
FIG. 4A shows a configuration of an ink supplying unit of a cartridge model printer.
Figure 4B:
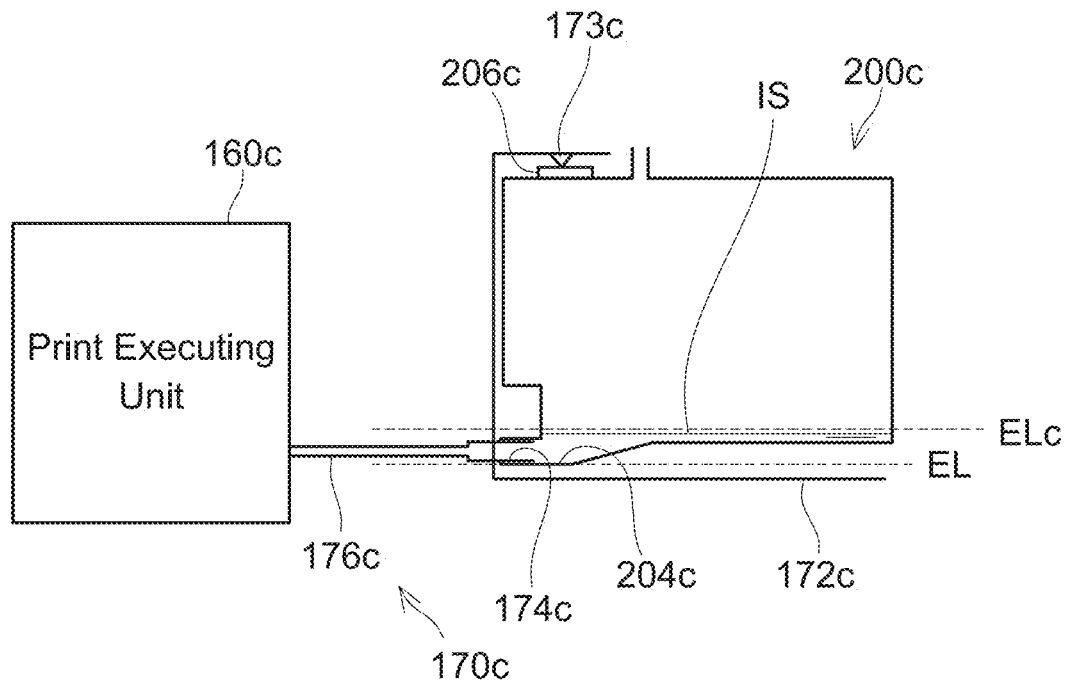
FIG. 4B shows a configuration of an ink supplying unit of a cartridge model printer.

(Configuration of Ink Supplying Unit 170c of Printer 100c: FIG. 4A and FIG. 4B)

Next, a configuration of the ink supplying unit 170c of the printer 100c will be described with reference to FIG. 4A and FIG. 4B. The printer 100c is a CTG model printer not comprising a sub-tank. As shown in FIG. 4A, the ink supplying unit 170c comprises an installment part 172c, an ink supply port 174c, and an ink flow path 176c.

The installment part 172c, the ink supply port 174c are respectively the same as the installment part 172a, the ink supply port 174a of the printer 100a (see FIG. 3A). Further, a contact point 173c is the same as the contact point 173a. Since a sub-tank does not exist, one end of the ink flow path 176c is connected with the ink supply port 174c. Another end of the ink flow path 176c is connected with the print executing unit 160c.

A size of an interior space of the CTG 200c that can be mounted in the ink supplying unit 170c is different from a size of an interior space of the CTG 200a. Consequently, an initial amount of ink in the CTG 200c is different from the initial amount of ink in the CTG 200a. For this reason, the number of total sheets TOc (see FIG. 2) of the printer 100c is different from the number of total sheets TOa of the printer 100a. However, in a variant, the number of total sheets TOc may be the same as the number of total sheets TOa. Since a sub-tank is not provided in the printer 100c, a number of tank sheets does not exist in the printer 100c. An ink outlet port 204c, an IC chip 206c of the CTG 200c are respectively the same as the ink outlet port 204a, the IC chip 206a of the CTG 200a (see FIG. 3A).

A sub-tank is not provided in the CTG model printer 100c. For this reason, the printer 100c shifts from a printable state to an unprintable state before the ink in the CTG 200c runs out. A reason therefore is as follows. That is, when the remaining amount of ink in the CTG 200c becomes low, air can enter the ink flow path 176c connected to the print executing unit 160c, and consequently air can be mixed into the ink supplied to the print executing unit 160c. In this case, the print executing unit 160c cannot execute printing properly. For this reason, a boundary between a remaining amount at which air does not mix with the ink and a remaining amount at which air can mix with the ink is set as an empty level ELc. That is, the empty level ELc is set to a position higher than the empty level EL at which the remaining ink amount in the CTG 200c reaches zero. FIG. 4B shows a state in which a liquid level IS of the ink in the CTG 200c has reached the empty level ELc. When this state is reached, the printer 100c shifts from the printable state to the unprintable state. When the printer 100c has shifted to the unprintable state, it is necessary to replace the CTG 200c in order to execute printing.

(Configuration of Ink Supplying Unit 170d of Printer 100d)

Like the printer 100c, the printer 100d is a CTG model printer. The ink supplying unit 170d of the printer 100d is the same as the ink supplying unit 170c of the printer 100c. Further, a size of an interior space of a CTG 200d that can be mounted in the ink supplying unit 170d is the same as the size of the interior space of the CTG 200c. Consequently, the initial amount of ink in the CTG 200d is the same as the initial amount of ink in the CTG 200c. For this reason, a number of total sheets TOd (see FIG. 2) of the printer 100d is the same as the number of total sheets TOc of the printer 100c. However, in a variant, the number of total sheets TOd may be a value different from the number of total sheets TOc.

As described above, in the present embodiment, the sub-tank model printers 100a. 100b and the CTG model printers 100c. 100d exist as management target printers of the management server 10. Therefore, when displaying each remaining amount object indicating the remaining ink amount in each of the printers 100a etc., the management server 10 displays each remaining amount object in a display manner corresponding to the model. Convenience for an administrator of the printers 100a to 100d (i.e., user(s) of the management server 10) is thereby improved. In order to realize this, the management server 10 uses the management DB 40, described below, to execute the processes of FIG. 6, etc., to be described later.

(Contents of Information in Management DB 40; FIG. 5)

Next, information in the management DB 40 of the management server 10 will be described with reference to FIG. 5. The management DB 40 includes one or more pieces of management information corresponding to one or more printers. Each of the one or more pieces of management information is information in which printer name, model name, ink supply model, three types of numbers of sheets, and two types of remaining rates are associated with each other. The three types of numbers of sheets includes a number of total sheets TO, a number of tank sheets TA, and a number of remaining sheets RE. The two types of remaining rates include a CTG remaining rate and a tank remaining rate.

The printer name, the model name, the three types of numbers of sheets are stored in the management DB 40 by being acquired from each of the printers 100a to 100d. The ink supply model is information indicating either sub-tank model or CTG model. Information indicating the sub-tank model is described in an ink supply model field in a case where the number of tank sheets is acquired from the printers 100a. 100b, and information indicating the CTG model is described in the ink supply model field in a case where the number of tank sheets is not acquired from the printers 100c, 100d. Since the number of tank sheets does not exist in CTG model printers, a field of the number of tank sheets is blank. Further, the two types of remaining rates are described in the management DB 40 by being calculated based on the three types of numbers of sheets.

The CTG remaining rate is a remaining rate of ink remaining in a CTG of a printer. In the sub-tank model, in a case where number of remaining sheets RE>number of tank sheets TA, i.e., in a case where ink is remaining in the CTG, the CTG remaining rate is calculated by a formula "100×(number of remaining sheets RE−number of tank sheets TA)/(number of total sheets TO−number of tank sheets TA)". On the other hand, in a case where the number of remaining sheets RE≤number of tank sheets TA, i.e., in a case where ink is not remaining in the CTG, the CTG remaining rate is 0%. Further, in the CTG model, the CTG remaining rate is calculated by a formula "100×number of remaining sheets RE/number of total sheets TO".

The tank remaining rate is a remaining rate of ink remaining in the sub-tank in a sub-tank model printer. In a case where number of remaining sheets RE>number of tank sheets TA, i.e., in a case where ink is remaining in the CTG, the tank remaining rate is 100%. On the other hand, in a case where number of remaining sheets RE≤number of tank sheets TA, i.e., in a case where ink is not remaining in the CTG, the tank remaining rate is calculated by a formula "100×number of remaining sheets RE/number of tank sheets TA". Since a sub-tank does not exist in a CTG model printer, the tank remaining rate field is blank.

Figure 6:
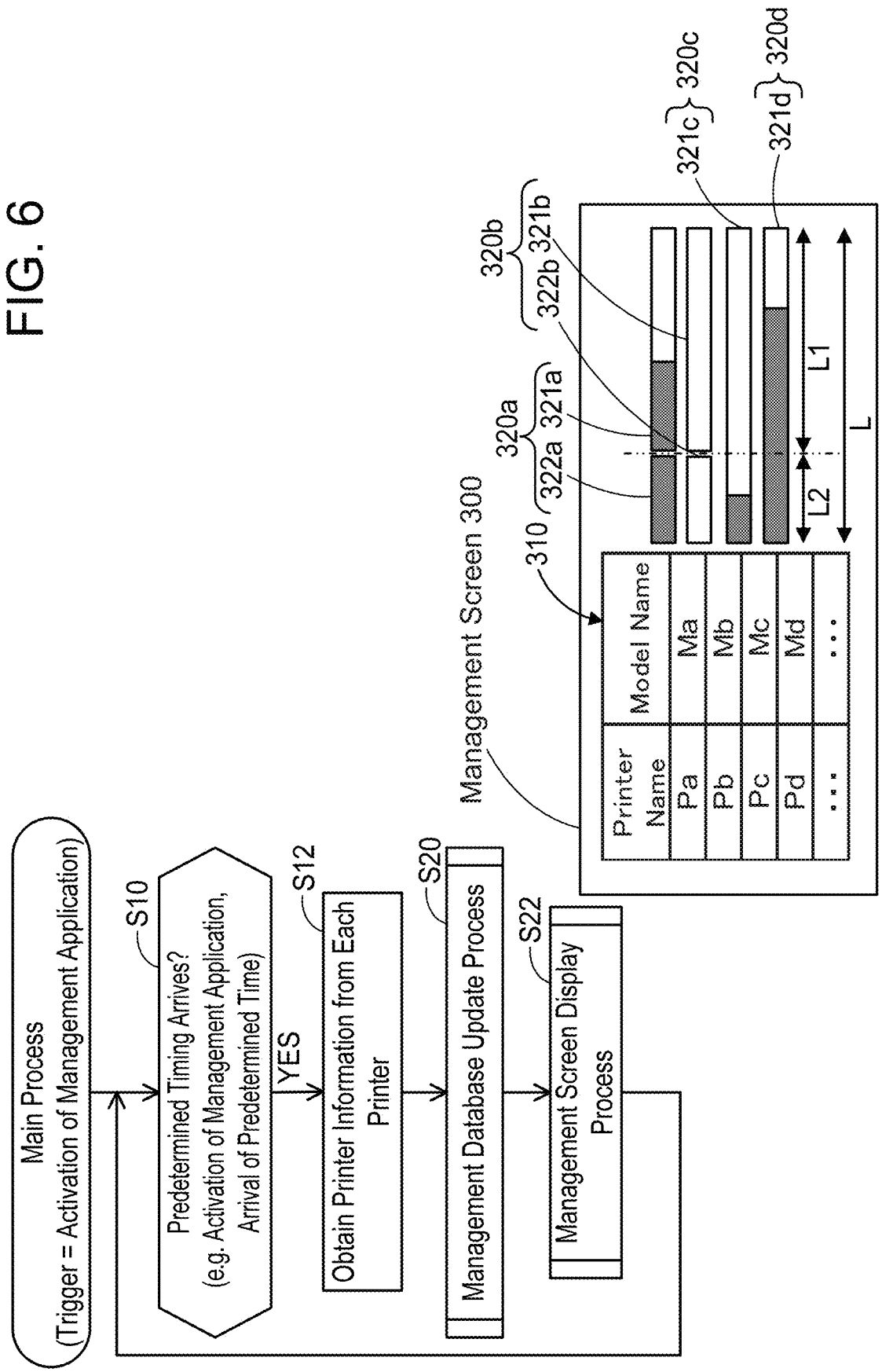
FIG. 6 shows a flowchart of a main process.

(Main Process: FIG. 6)

Next, contents of a main process executed by the CPU 32 of the management server 10 according to the management application 38 will be described with reference to FIG. 6. The CPU 32 starts a process of FIG. 6 when the management application 38 is activated by the administrator.

In S10, the CPU 32 monitors arrival of a predetermined timing. In the present embodiment, the predetermined timing includes a timing at which the management application 38 is activated, and a timing at which a predetermined time (e.g., times coming once every hour) arrives. In a variant, the predetermined timing may be a timing at which a predetermined instruction is given by the administrator. In a case where the predetermined timing arrives, the CPU 32 determines YES in S10, and proceeds to S12.

In S12, the CPU 32 acquires printer information from each of the printers 100a to 100d connected to the LAN 6. The respective printer information includes the printer name, model name, and ink information. Specifically, the CPU 32 sends a request signal requesting sending of the printer information by broadcast to the LAN 6. Thereby, the CPU 32 acquires the printer information by receiving the printer information from each of the printers 100a to 100d as a response to the request signal.

Figure 7:
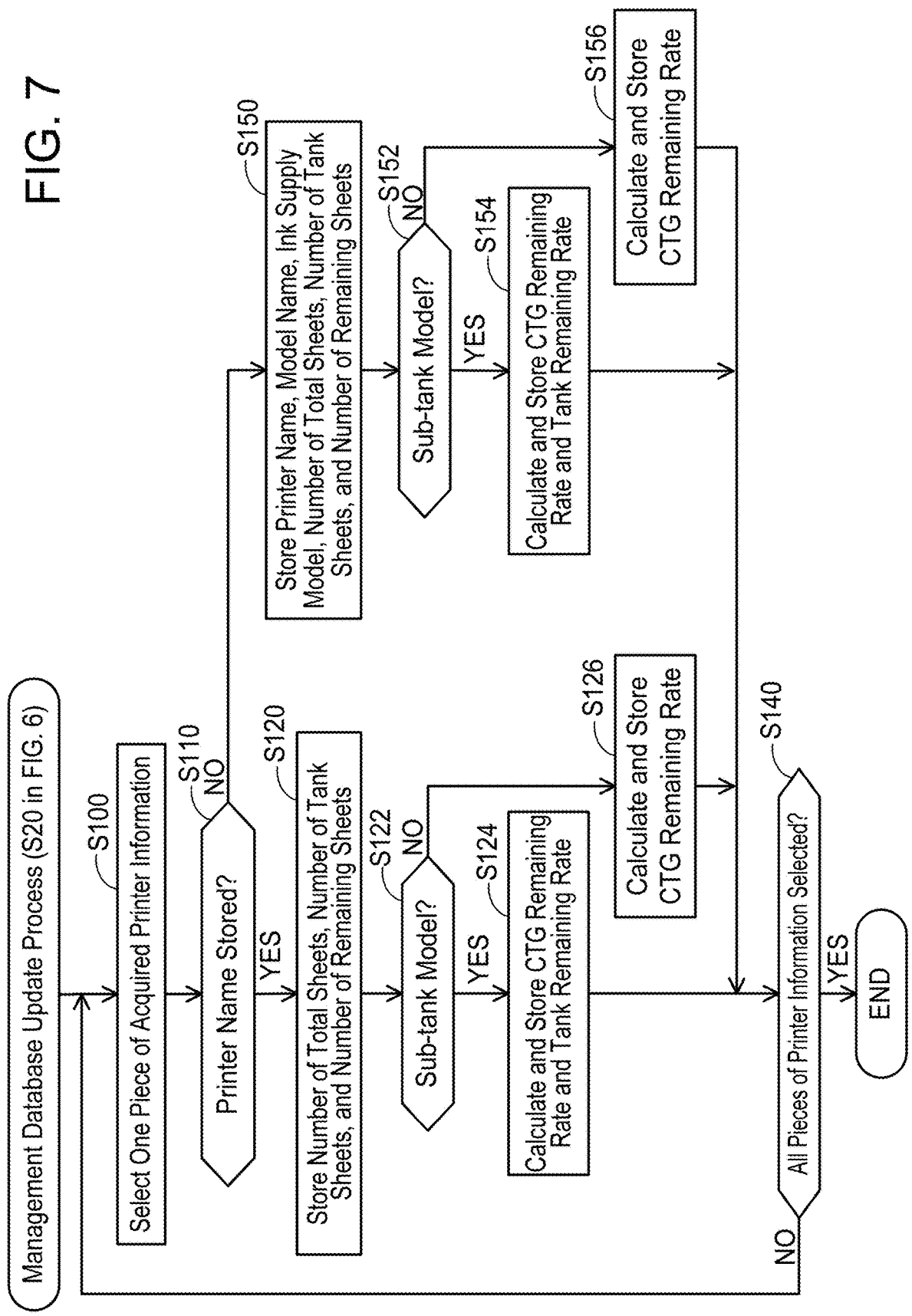
FIG. 7 shows a flowchart of a management database update process.

In S20, the CPU 32 executes a management database update process (see FIG. 7). This process is a process of updating the information in the management DB 40 using the pieces of printer information acquired in S12.

Figure 8:
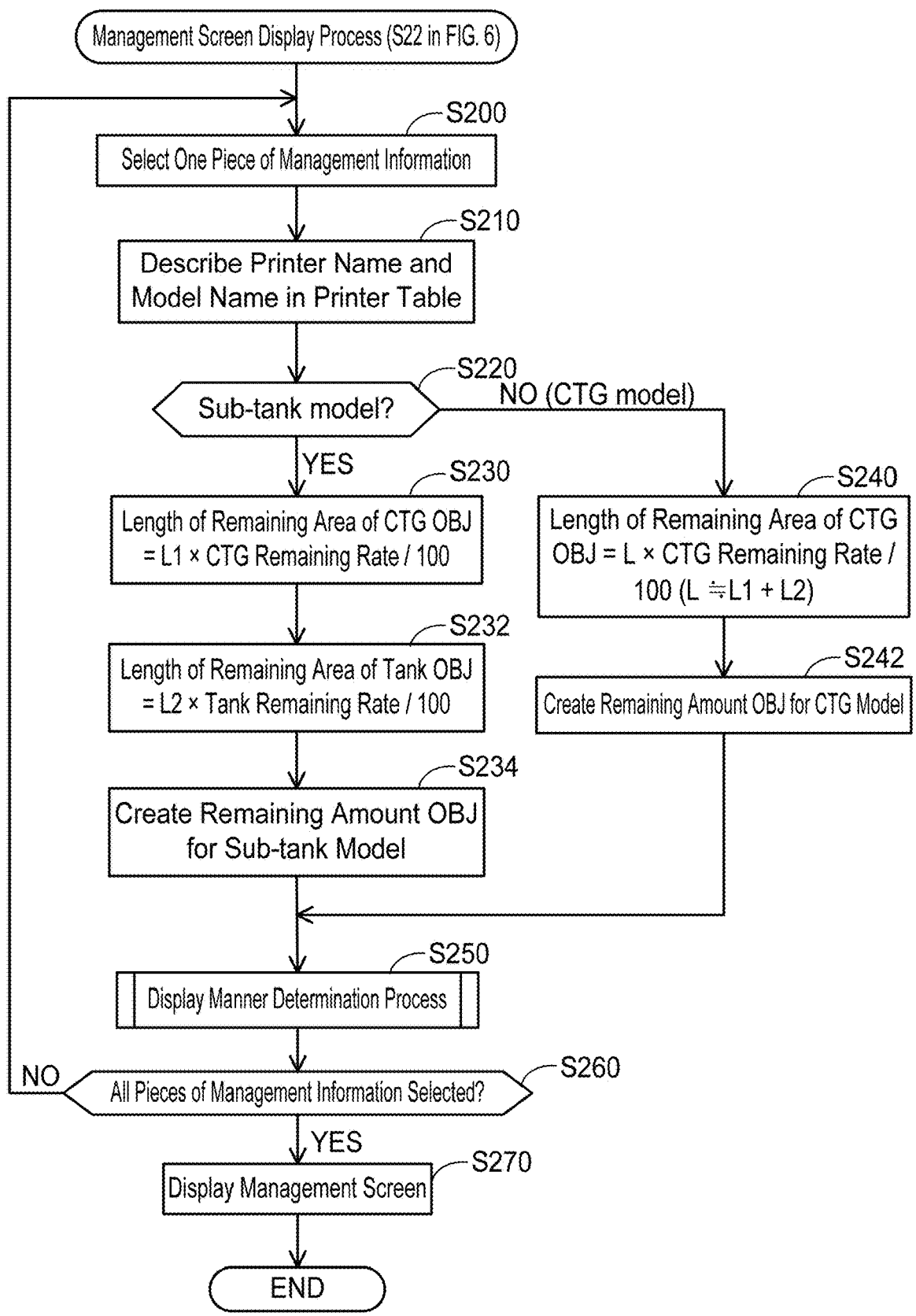
FIG. 8 shows a flowchart of a management screen display process.

In S22, the CPU 32 executes a management screen display process (see FIG. 8). This process is a process for displaying a management screen on the display unit 14 using the information in the management DB 40 updated in S20. FIG. 6 shows an example of a management screen 300. The management screen 300 includes a printer table 310, and remaining amount objects 320a to 320d. Below, object may be termed "OBJ (Object)".

In the printer table 310, the printer name and the model name are associated with each other (i.e., are arranged in a straight line). The remaining amount OBJs 320a to 320d are associated with the printer names and the model names (i.e., are arranged in straight lines), and indicate the remaining ink amount in the printer having the associated printer name. For example, the remaining amount OBJ 320a associated with the printer name "Pa" indicates the remaining ink amount in the printer 100a having the printer name "Pa". Below, the remaining amount OBJ associated with a printer name is expressed as the remaining amount OBJ corresponding to the printer having this printer name.

The remaining amount OBJ 320a corresponding to the sub-tank model printer 100a (i.e., printer name "Pa") includes a CTG OBJ 321a indicating the remaining ink amount in the CTG 200a, and a tank OBJ 322a indicating the remaining ink amount in the sub-tank 175a. Similarly, a remaining amount OBJ 320b corresponding to the sub-tank model printer 100b (i.e., printer name "Pb") includes a CTG OBJ 321b and a tank OBJ 322b. Further, a remaining amount OBJ 320c corresponding to the CTG model printer 100c (i.e., printer name "Pc") includes a CTG OBJ 321c. Since the printer 100c is a CTG model, the remaining amount OBJ 320c does not include a tank OBJ. Similarly, a remaining amount OBJ 320d corresponding to the CTG model printer 100d (i.e., printer name "Pd") includes a CTG OBJ 321d, and does not include a tank OBJ. The aforementioned OBJs 321a to 321d, 322a, 322b have a band shape extending in a straight line S10 along a right-left direction (in other words, a bar shape). When S22 ends, the process returns to.

(Management Database Update Process: FIG. 7)

Next, contents of the management database update process executed in S20 of FIG. 6 will be described with reference to FIG. 7. In S100, the CPU 32 selects one piece of printer information from among the one or more pieces of printer information acquired in S12 of FIG. 6. Below, the printer information selected here is called "selected printer information".

In S110, the CPU 32 determines whether the printer name included in the selected printer information (hereinbelow termed "selected printer name") has been stored in the management DB 40. The CPU 32 proceeds to S120 in case of determining that the selected printer name has been stored (YES in S110), and proceeds to S150 in case of determining that the selected printer name has not been stored (NO in S110).

In S120, the CPU 32 stores each of the number of total sheets, the number of tank sheets, and the number of remaining sheets included in the selected printer information in respective fields of the number of total sheets, the number of tank sheets, and the number of remaining sheets included in the management information that includes the selected printer name (hereinbelow termed "selected management information").

In S122, the CPU 32 determines whether the ink supply model included in the selected management information is the sub-tank model. The CPU 32 proceeds to S124 in case of determining that the ink supply model is the sub-tank model (YES in S122), and proceeds to S126 in case of determining that the ink supply model is the CTG model (NO in S122).

In S124, the CPU 32 uses the number of total sheets, the number of tank sheets, and the number of remaining sheets included in the selected management information to calculate the CTG remaining rate and the tank remaining rate (see formulas of FIG. 5). Then, the CPU 32 stores each of the calculated CTG remaining rate and the calculated tank remaining rate in respective fields of the CTG remaining rate and the tank remaining rate included in the selected management information.

In S126, the CPU 32 uses the number of total sheets and the number of remaining sheets included in the selected management information to calculate the CTG remaining rate (see the formula of FIG. 5). Then, the CPU 32 stores the calculated CTG remaining rate in a CTG remaining rate field included in the selected management information. When S124 or S126 ends, the process proceeds to S140.

Further, in S150, the CPU 32 stores new management information in the management DB 40. Specifically, the CPU 32 first stores the printer name and the model name included in the selected printer information. Further, the CPU 32 stores the sub-tank model as the ink supply model in a case where the selected printer information includes the number of tank sheets, and stores the CTG model as the ink supply model in a case where the selected printer information does not include the number of tank sheets. Next, in the case where the ink supply model is the sub-tank model, the CPU 32 stores the number of total sheets, the number of tank sheets, and the number of remaining sheets. On the other hand, in the case where the ink supply model is the CTG model, the CPU 32 stores the number of total sheets and the number of remaining sheets.

S152 to S156 are the same as S122 to S126. When S154 or S156 ends, the process proceeds to S140.

In S140, the CPU 32 determines whether all the pieces of printer information acquired in S12 of FIG. 6 have been selected in S100. In case of determining that all the pieces of printer information have been selected (YES in S140), the CPU 32 ends the process of FIG. 7. On the other hand, in case of determining that not all the pieces of printer information have been selected (NO in S140), the CPU 32 returns to S100, and selects another piece of the printer information.

(Management Database Display Process; FIG. 8)

Next, contents of the management database display process executed in S22 of FIG. 6 will be described with reference to FIG. 8. In S200, the CPU 32 selects one piece of management information from among the one or more pieces of management information in the management DB 40. Below, the piece of management information selected here is called "selected management information".

In S210, the CPU 32 describes the printer name and the model name included in the selected management information in association with each other in the printer table 310 (see FIG. 6).

In S220, the CPU 32 determines whether the ink supply model included in the selected management information is the sub-tank model. The CPU 32 proceeds to S230 in case of determining that the ink supply model is the sub-tank model (YES in S220), and proceeds to S240 in case of determining that the ink supply model is the CTG model (NO in S220).

As described above, a remaining amount OBJ (e.g., 320a of FIG. 6) corresponding to the sub-tank model printer includes a CTG OBJ (e.g., 321a) and a tank OBJ (e.g., 322a). Here, in the CTG OBJ and the tank OBJ, a filled area indicates that ink is remaining, and an unfilled area indicates that ink is not remaining. Below, the former area is called "remaining area".

In S230, the CPU 32 calculates a length of the remaining area of the CTG OBJ included in the remaining amount OBJ corresponding to the sub-tank model printer. Specifically, the CPU 32 calculates the length of the remaining area of the CTG OBJ using the formula "length L1×CTG remaining rate/100". Here, the length L1 in the formula is a length predetermined as the length of the CTG OBJ. Further, the CTG remaining rate in the formula is the CTG remaining rate included in the selected management information.

In S232, the CPU 32 calculates the length of the remaining area of the tank OBJ included in the remaining amount OBJ corresponding to the sub-tank model printer. Specifically, the CPU 32 calculates the length of the remaining area of the tank OBJ using the formula "length L2×tank remaining rate/100". Here, the length L2 in the formula is a length predetermined as the length of the tank OBJ. Further, the tank remaining rate in the formula is the tank remaining rate included in the selected management information.

In S234, the CPU 32 creates the remaining amount OBJ corresponding to the sub-tank model printer. Specifically, the CPU 32 first fills an area having the length calculated in S230 in a band-shaped rectangle OBJ having the length L1. In particular, in the present embodiment, this is filled from a left end toward a right side of the rectangle OBJ. Thereby, the CTG OBJ including the remaining area having the length calculated in S230 is completed. Further, the CPU 32 fills an area having the length calculated in S232 in a band-shaped rectangle OBJ having the length L2. In particular, in the present embodiment, this is filled from the left end toward the right side of the rectangle OBJ. Thereby, the tank OBJ including the remaining area having the length calculated in S232 is completed. Then, the CPU 32 positions the CTG OBJ on the right side and positions the tank OBJ on the left side such that a small gap having a predetermined length is formed between the CTG OBJ and the tank OBJ. Here, the printer name and the model name described in S210, the CTG OBJ, and the tank OBJ are arranged on a straight line extending in the left-right direction. Thereby, the remaining amount OBJ corresponding to the sub-tank model printer is completed. Since there is a gap in this remaining amount OBJ (i.e., since the CTG OBJ and the tank OBJ are displayed separately), the administrator can easily acknowledge that this remaining amount OBJ indicates the remaining ink amount in a sub-tank model printer.

Further, in S240, the CPU 32 calculates the length of the remaining area of the CTG OBJ included in the remaining amount OBJ corresponding to the CTG model printer. Specifically, the CPU 32 calculates the length of the remaining area of the CTG OBJ using the formula "length L×CTG remaining rate/100". Here, the length L in the formula is a length predetermined as the length of the remaining amount OBJ (i.e., the length of the CTG OBJ corresponding to the CTG model). The length L is approximately equal to a sum of the length L1 and the length L2 used in S230 and S232. Specifically, the length L is a value obtained by subtracting a length of the aforementioned gap from the sum of the length L1 and the length L2. Further, the CTG remaining rate in the formula is the CTG remaining rate included in the selected management information.

In S242, the CPU 32 creates the remaining amount OBJ corresponding to the CTG model printer. Specifically, the CPU 32 first fills an area having the length calculated in S240 in the band-shaped rectangle OBJ having the length L. In particular, in the present embodiment, this is filled from the left end toward the right side of the rectangle OBJ. Thereby, the CTG OBJ including the remaining area having the length calculated in S240 is completed. Here, the printer name and the model name described in S210, and the CTG OBJ are arranged on a straight line extending in the left-right direction. Thereby, the remaining amount OBJ corresponding to the CTG model printer is completed. Since a gap does not exist in this remaining amount OBJ (i.e., since the tank OBJ does not exist), the administrator can easily acknowledge that this remaining amount OBJ indicates the remaining ink amount in a CTG model printer.

In S234 and S242, the CPU 32 positions each remaining amount OBJ such that respective left end positions of the remaining amount OBJs match in the left-right direction. Thereby, the remaining amount OBJs are aligned in a vertical direction (see 320a to 320d of FIG. 6). Further, in a case where a plurality of remaining amount OBJs that correspond to a plurality of sub-tank model printers exists, gaps of the plurality of remaining amount OBJs are in a matching position (see 320a, 320b) in the left-right direction. Since each remaining amount OBJ is positioned in this manner, the administrator can easily grasp the remaining ink amounts in the printers 100a to 100d while comparing these printers 100a to 100d.

Figure 9:
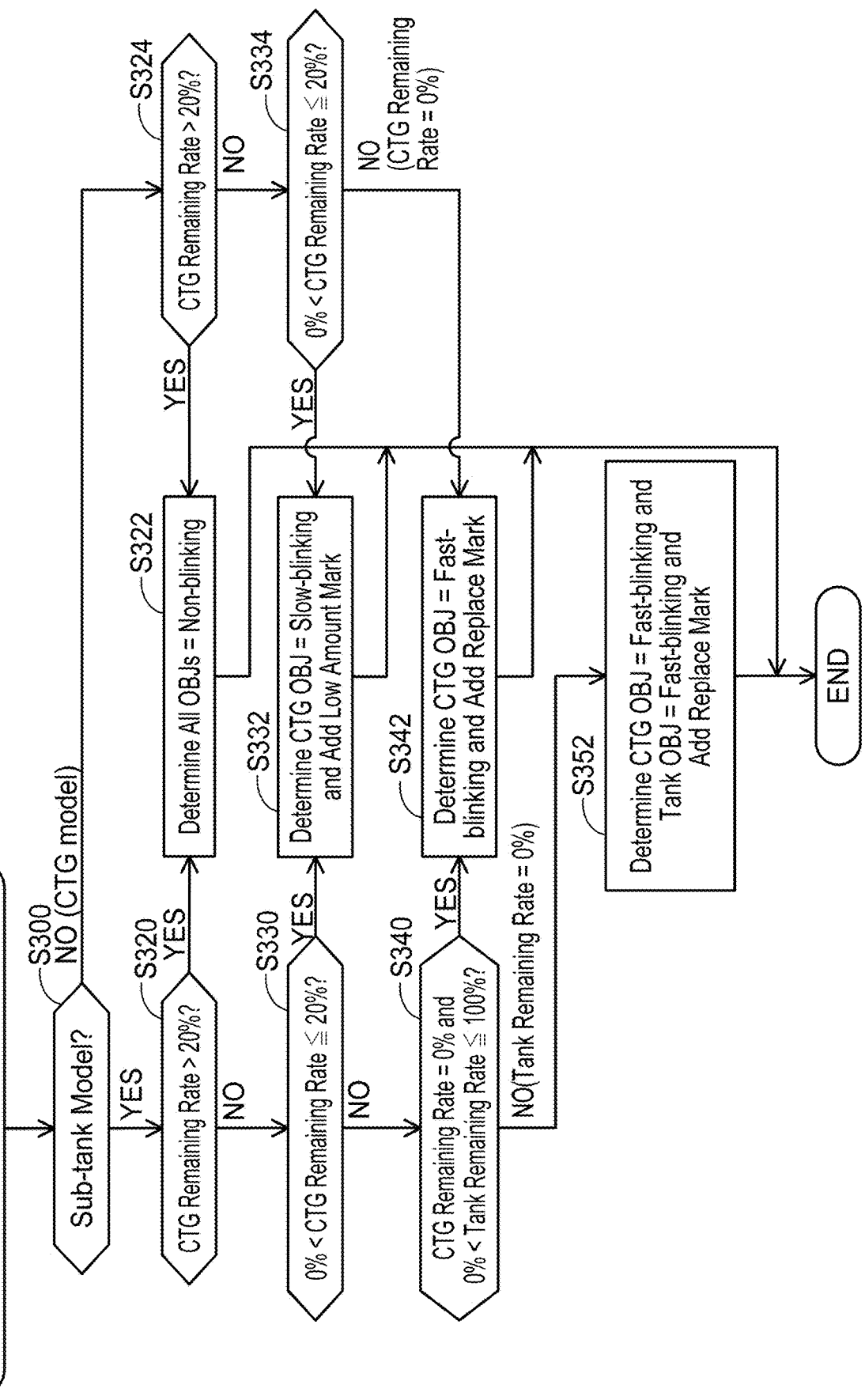
FIG. 9 shows a flowchart of a display manner determination process.

In S250, the CPU 32 executes a display manner determination process (see FIG. 9). This process is a process of determining a display manner for the remaining amount OBJ created in S234 or S242 (hereinbelow termed "target remaining amount OBJ").

In S260, the CPU 32 determines whether all the pieces of management information in the management DB 40 have been selected in S200. The CPU 32 proceeds to S270 in case of determining that all the pieces of management information have been selected (YES in S260). On the other hand, in case of determining that not all the pieces of management information have been selected (NO in S260), the CPU 32 returns to S200, and selects other management information.

In S270, the CPU 32 displays, in the display unit 14, the management screen 300 including the printer table 310 created in S210, and the target remaining amount OBJs created in S232 and S242. Here, each of the target remaining amount OBJs has the display manner determined in S250. When S270 ends, the process of FIG. 8 ends.

(Display Manner Determination Process: FIG. 9)

Next, contents of the display manner determination process executed in S250 of FIG. 8 will be described with reference to FIG. 9. S300 is the same as S220 of FIG. 8. The CPU 32 proceeds to S320 in case of determining that the ink supply model is the sub-tank model (YES in S300), and proceeds to S324 in case of determining that the ink supply model is the CTG model (NO in S300).

In S320, the CPU 32 determines whether the CTG remaining rate included in the selected management information is greater than 20%. Here, 20% is a threshold value for notifying the administrator that the ink in a CTG is low. In a variant, a value different from 20% may be adopted as this threshold value. Further, in the present embodiment the threshold value is a predetermined fixed value. However, in a variant the threshold value may be a value designated by the administrator. The CPU 32 proceeds to S322 in case of determining that the CTG remaining rate is greater than 20% (YES in S320), and proceeds to S330 in case of determining that the CTG remaining rate is equal to or less than 20% (NO in S320).

S324 is the same as S320. The CPU 32 proceeds to S322 in a case where YES is determined in S324, and proceeds to S334 in a case where NO is determined in S324.

In S322, the CPU 32 determines to display all the OBJs included in the target remaining amount OBJ in a non-blinking manner. That is, for the target remaining amount OBJ of the sub-tank model (the case of YES in S320), the CPU 32 determines to display both the CTG OBJ and the tank OBJ in a non-blinking manner. Further, for the target remaining amount OBJ of the CTG model (the case of YES in S324), the CPU 32 determines to display the CTG OBJ in a non-blinking manner. Further, the CPU 32 determines not to display either a low remaining amount mark or a replace mark, which will be described later. When S322 ends, the process of FIG. 9 ends.

In S330, the CPU 32 determines whether the CTG remaining rate included in the selected management information is greater than 0% and equal to or less than 20%. The CPU 32 proceeds to S332 in case of determining that the CTG remaining rate is greater than 0% and equal to or less than 20% (YES in S330), and proceeds to S340 in case of determining that the CTG remaining rate is 0% (NO in S330).

S334 is the same as S330. The CPU 32 proceeds to S332 in case of determining YES in S334, and proceeds to S342 in case of determining NO in S334.

In S332, the CPU 32 determines to display the CTG OBJ included in the target remaining amount OBJ in a slow-blinking manner and, further, determines to additionally display the low remaining amount mark indicating that the remaining ink amount in the CTG is low. Here, the slow-blinking manner, in the present embodiment, means blinking at a cycle of one second but, in a variant, may be blinking at a cycle of a period longer or shorter than one second. In S332, for the target remaining amount OBJ of the sub-tank model (case of YES in S330), the CPU 32 determines to display the tank OBJ in the non-blinking manner. When S332 ends, the process of FIG. 9 ends.

In S340, the CPU 32 determines whether the CTG remaining rate included in the selected management information is 0% and the tank remaining rate included in the selected management information is greater than 0%. The CPU 32 proceeds to S342 in case of determining that the CTG remaining rate is 0% and the tank remaining rate is greater than 0% (YES in S340), and proceeds to S352 in case of determining that the CTG remaining rate is 0% and the tank remaining rate is 0% (NO in S340).

In S342, the CPU 32 determines to display the CTG OBJ included in the target remaining amount OBJ in a fast-blinking manner and, further, determines to additionally display the replace mark indicating that the CTG can be replaced. Here, the fast-blinking manner means blinking at a cycle shorter than that of the slow-blinking manner. The fast-blinking manner, in the present embodiment, means blinking at a cycle of 0.5 second but, in a variant, may be blinking at a cycle of a period longer or shorter than 0.5 second. Further, the replace mark is a mark different from the low remaining amount mark. In S342, for the target remaining amount OBJ of the sub-tank model (the case of YES in S340), the CPU 32 determines to display the tank OBJ in the non-blinking manner. When S342 ends, the process of FIG. 9 ends.

In S352, the CPU 32 determines to display the CTG OBJ included in the target remaining amount OBJ in the fast-blinking manner, determines to display the tank OBJ included in the target remaining amount OBJ in the fast-blinking manner and, further, determines to additionally display the replace mark indicating that the CTG can be replaced. When S352 ends, the process of FIG. 9 ends.

As described above, in S270 of FIG. 8, the CPU 32 displays the management screen 300 including the target remaining amount OBJs respectively having the display manners determined in S250. Here, in a case where it was determined to display the plurality of remaining amount OBJs in the slow-blinking manner, the CPU 32 synchronizes the blinking timings of the plurality of remaining amount OBJs. Here, the synchronizing of blinking timings means that the timings of starting the display of each OBJ synchronize with each other, and the timings of ending the display of each OBJ synchronize with each other. Further, in a case where it was determined to display the plurality of remaining amount OBJs in the fast-blinking manner, the CPU 32 synchronizes the blinking timings of the plurality of remaining amount OBJs. Further, in a case where it was determined to add the low remaining amount mark or the replace mark for the target remaining amount OBJ, the CPU 32 adds these marks such that these marks overlap the CTG OBJ included in the target remaining amount OBJ.

If the blinking timings of the plurality of remaining amount OBJs are not synchronized, it would be difficult for the administrator to recognize that states related to the remaining ink amounts in the plurality of printers corresponding to the plurality of remaining amount OBJs are the same in the respective printers. Since the blinking timings of the plurality of remaining amount OBJs are synchronized in the present embodiment, the administrator can easily recognize that the states related to the remaining ink amount are the same in the respective printers. In a variant, the blinking timings of the plurality of remaining amount OBJs may not be synchronized.

Figure 10:
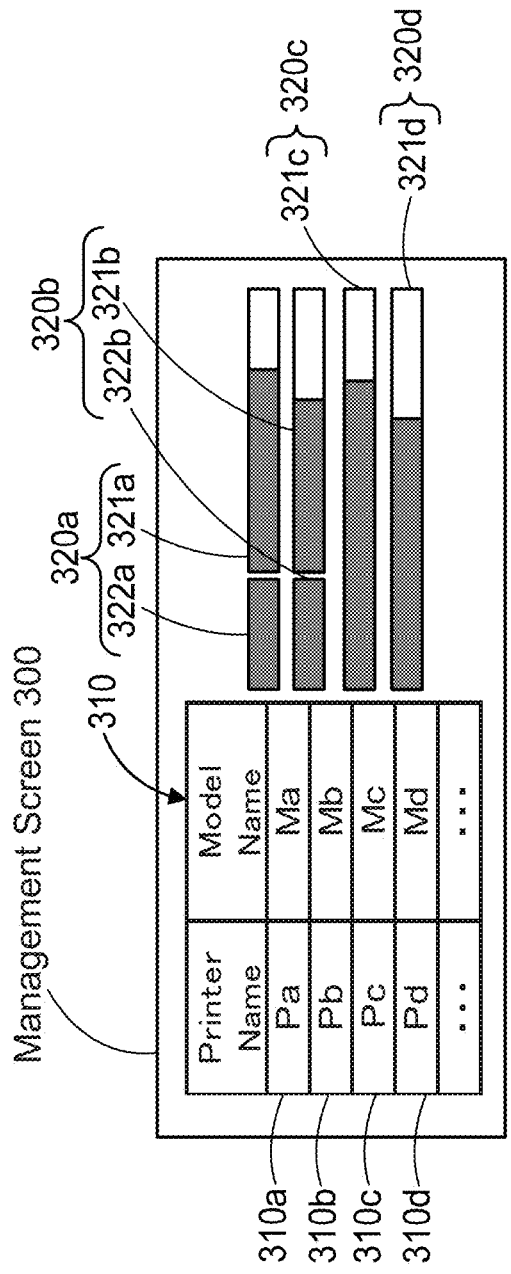
FIG. 10 shows a case A in which all remaining amount objects are displayed in a non-blinking manner.

(Case A: FIG. 10)

Next, specific cases realized by the processes of FIG. 6 to FIG. 9 will be described with reference to FIG. 10 to FIG. 14. In case A of FIG. 10, the CTG remaining rates of all the printers 100a to 100d are greater than 20%. For this reason, it is determined that all the remaining amount OBJs 320a to 320d corresponding to all the printers 100a to 100d are displayed in the non-blinking manner (S322 of FIG. 9). For this reason, all the remaining amount OBJs 320a to 320d have the non-blinking manner and include neither the low remaining amount mark nor the replace mark. Thus, since each remaining amount OBJ 320a to 320d has the same display manner (i.e., non-blinking and without marks), the administrator can easily recognize, in any of the printers 100a to 100d, that the remaining ink amounts in the CTGs are comparatively large, and that it is not yet necessary to replace any CTG.

Figure 11:
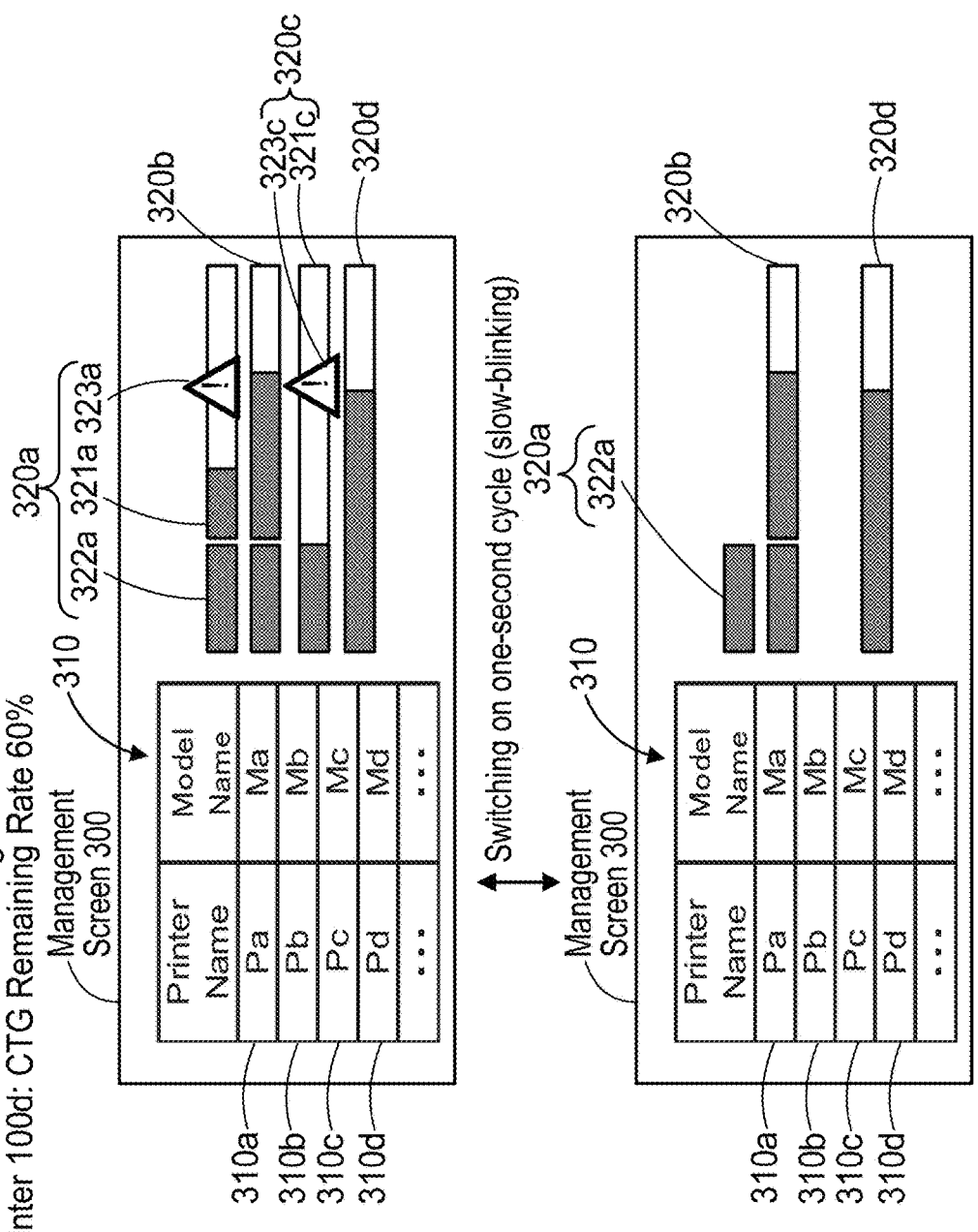
FIG. 11 shows a case B in which two remaining amount objects are displayed in a slow-blinking manner.

(Case B; FIG. 11)

Case B of FIG. 11 shows a case after printing has been executed in the printer 100a and the printer 100c from the state of case A of FIG. 10. Specifically, the CTG remaining rate of the printer 100a reaches 20%, and the CTG remaining rate of the printer 100c reaches 20%. In this case, for the remaining amount OBJ 320a corresponding to the printer 100a, it is determined that the CTG OBJ 321a is displayed in the slow-blinking manner, and further it is determined that the low remaining amount mark 323a is displayed (S332 in the case of YES in S330). Further, for the remaining amount OBJ 320c related to the printer 100c, it is determined that the CTG OBJ 321c is displayed in the slow-blinking manner, and that the low remaining amount mark 323c is added and displayed (S332 in the case of YES in S334).

Consequently, the two CTG OBJs 321a. 321c included in the two remaining amount OBJs 320a, 320c have the same slow-blinking manner. Further, the two remaining amount OBJs 320a. 320c include the same low remaining amount marks 323a, 323c. Thus, since each remaining amount OBJ 320a, 320c has the same display manner (i.e., slow-blinking and low remaining amount mark), the administrator can easily recognize that the remaining ink amount in the CTG is comparatively small in both the sub-tank model printer 100a and the CTG model printer 100c. Thereby, the administrator can prepare (e.g., purchase) new CTGs for both the sub-tank model printer 100a and the CTG model printer 100c.

Further, the tank OBJ 322a included in the remaining amount OBJ 320a has the non-blinking manner. For this reason, the administrator can easily recognize that, in the sub-tank model printer 100a, it is possible to execute printing using the ink in the sub-tank 175a. In a variant, in case B, the tank OBJ 322a may have the slow-blinking manner.

The low remaining amount marks 323a, 323c are not restricted to the mark of the present embodiment, but may be another mark indicating that the remaining ink amount in the CTG is low. For example, a mark showing a character string "Low on Ink" may be adopted.

(Case C1: FIG. 12)

Case C1 of FIG. 12 shows a case after printing has been executed in the printer 100a from the state of case B of FIG. 11. Specifically, the CTG remaining rate of the printer 100a reaches 0%. In this case, for the remaining amount OBJ 320a corresponding to the printer 100a, it is determined that the CTG OBJ 321a is displayed in the fast-blinking manner, and it is determined that the replace mark 324a is displayed (S342 in the case of YES in S340).

Consequently, the CTG OBJ 321a included in the remaining amount OBJ 320a has the fast-blinking manner, and includes the replace mark 324a. However, the CTG OBJ 321c included in the remaining amount OBJ 320c has the slow-blinking manner, and includes the low remaining amount mark 323c. Thus, the remaining amount OBJs 320a. 320c have different display manners, the administrator can easily recognize that the states related to the remaining ink amount are different for the sub-tank model printer 100a and the CTG model printer 100c. In particular, since the CTG OBJ 321a has the fast-blinking manner and includes the replace mark 324a, the administrator can easily recognize that the CTG of the printer 100a should be replaced.

Further, the tank OBJ 322a included in the remaining amount OBJ 320a has the non-blinking manner. For this reason, the administrator can easily recognize, in the sub-tank model printer 100a, that it is possible to execute printing using the ink in the sub-tank 175a. In a variant, in case C1, the tank OBJ 322a may have the fast-blinking manner.

(Case C2; FIG. 12)

Case C2 of FIG. 12 shows a case after printing has been executed in the printer 100c from the state of case B of FIG. 11. Specifically, the CTG remaining rate of the printer 100c reaches 0%. In this case, for the remaining amount OBJ 320c corresponding to the printer 100c, it is determined that the CTG OBJ 321c is displayed in the fast-blinking manner, and further it is determined that the replace mark 324c is displayed (S342 in the case of NO in S334).

Consequently, the CTG OBJ 321c included in the remaining amount OBJ 320c has the fast-blinking manner, and includes the replace mark 324c. However, the CTG OBJ 321a included in the remaining amount OBJ 320a has the slow-blinking manner, and includes the low remaining amount mark 323a. Thus, since the remaining amount OBJs 320a, 320c have different display manners, the administrator can easily recognize that the states related to the remaining ink amount are different for the sub-tank model printer 100a and the CTG model printer 100c. In particular, since the CTG OBJ 321c has the fast-blinking manner and includes the replace mark 324c, the administrator can easily recognize that the CTG of the printer 100c should be replaced.

The replace marks 324a. 324c are not restricted to the mark of the present embodiment, but may be another mark indicating that the CTG should be replaced. For example, a mark showing a character string "Replace Cartridge" may be adopted.

Figure 13:
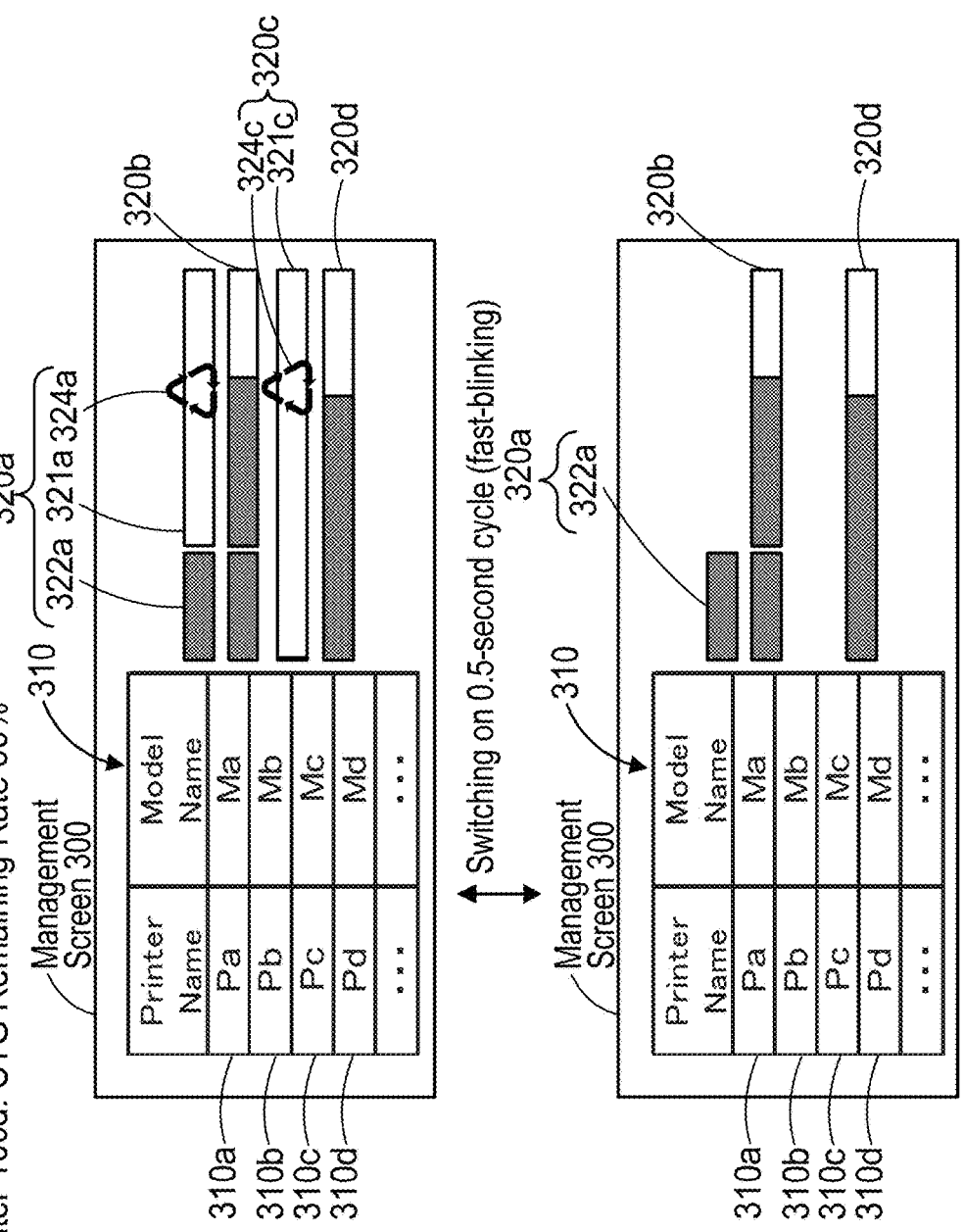
FIG. 13 shows a case D in which two remaining amount objects are displayed in the fast-blinking manner.

(Case D: FIG. 13)

Case D of FIG. 13 shows a case after printing has been executed in the printer 100a and the printer 100c from the state of case B of FIG. 11. Specifically, the CTG remaining rate of the printer 100a reaches 0%, and the CTG remaining rate of the printer 100c reaches 0%. In this case, the remaining amount OBJ 320a is displayed similarly to case C1 of FIG. 12, and the remaining amount OBJ 320c is displayed similarly to case C2.

Consequently, the two CTG (OBJs 321a. 321c included in the two remaining amount OBJs 320a. 320c have the same fast-blinking manner. Further, the two remaining amount OBJs 320a. 320c include the same replace marks 324a. 324c. Thus, since the remaining amount OBJs 320a, 320c have the same display manner (i.e., fast-blinking and replace mark), the administrator can easily recognize that the CTG should be replaced in both the sub-tank model printer 100a and the CTG model printer 100c.

Figure 14:
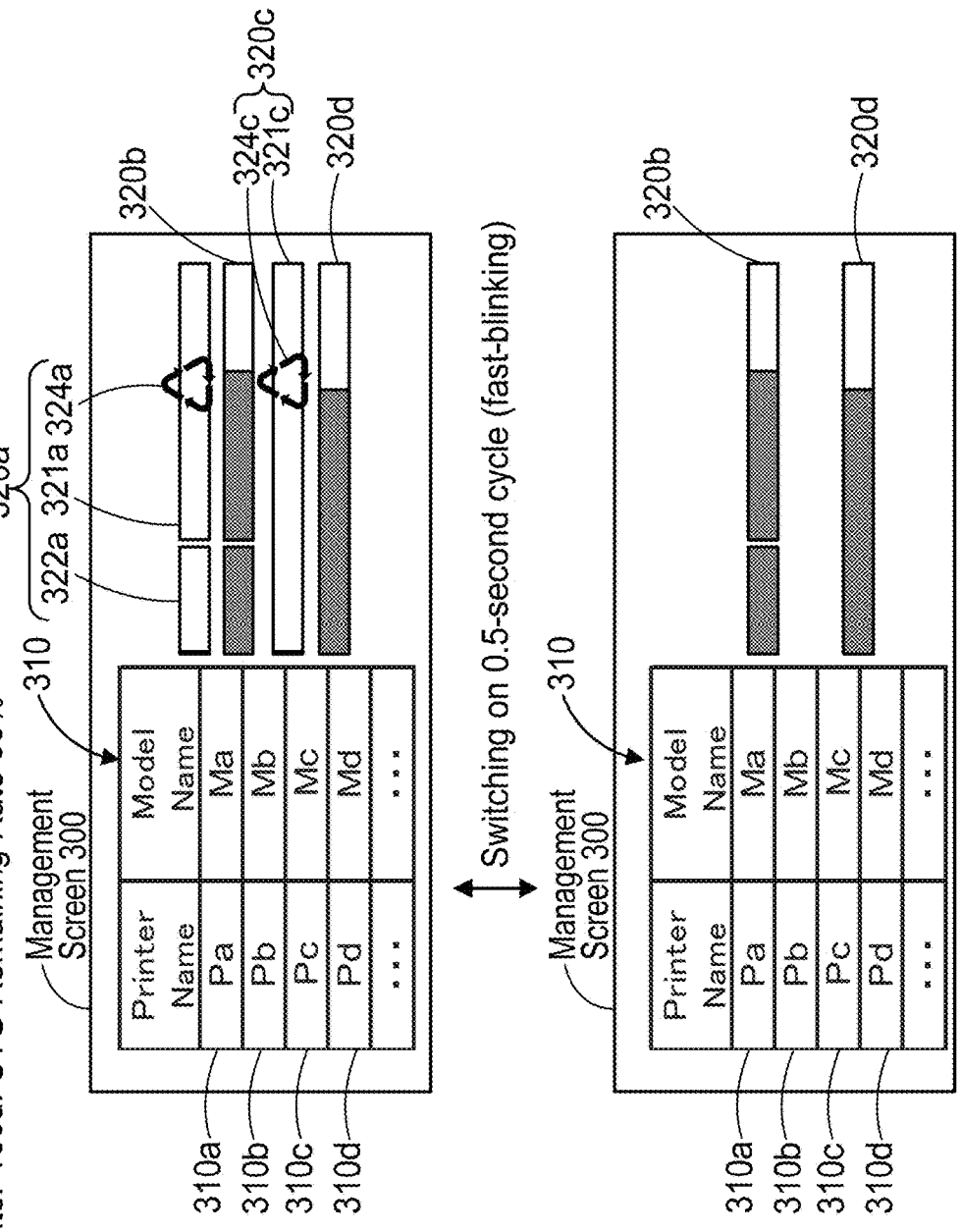
FIG. 14 shows a case E in which two remaining amount objects are displayed in the fast-blinking manner.

(Case E: FIG. 14)

Case E of FIG. 14 shows a case after printing has been executed in the printer 100a from the state of case D of FIG. 13. Specifically, the tank remaining rate of the printer 100a reaches 0%. In this case, for the remaining amount OBJ 320a corresponding to the printer 100a, it is determined that the CTG OBJ 321a is displayed in the fast-blinking manner, it is determined that the tank OBJ 322a is displayed in the fast-blinking manner, and further it is determined that the replace mark 324a is displayed (S352).

Consequently, the two CTG OBJs 321a. 321c and the tank OBJ 322a included in the two remaining amount OBJs 320a. 320c have the same fast-blinking manner. Further, the two remaining amount OBJs 320a. 320c include the same replace marks 324a. 324c. Thus, since the remaining amount OBJs 320a. 320c have the same display manner (i.e., fast-blinking and the replace mark), the administrator can easily recognize that the CTG should be replaced in both the sub-tank model printer 100a and the CTG model printer 100c.

Further, the tank OBJ 322a included in the remaining amount OBJ 320a also has the fast-blinking manner. For this reason, the administrator can easily recognize that, in the sub-tank model printer 100a, printing cannot be executed since ink is not remaining in the sub-tank 175a.

Effect of Embodiment

In the present embodiment, a situation is assumed in which the sub-tank model printer 100a exists in which ink is supplied from the CTG 200a to the print executing unit 160a via the sub-tank 175a, and the CTG model printer 100c exists in which ink is supplied from the CTG 200c to the print executing unit 160c without an intervention of a sub-tank. In such a situation, in a case where the CTG remaining rate of the sub-tank model printer 100a is greater than 20%, the management server 10 displays the remaining amount OBJ 320a having the non-blinking manner and not including the low remaining amount mark or the replace mark and, in a case where the CTG remaining rate of the CTG model printer 100c is greater than 20%, displays the remaining amount OBJ 320c having the non-blinking manner and not including the low remaining amount mark or the replace mark (see case A of FIG. 10). Thus, when the remaining amount OBJs 320a, 320c having the same display manner are displayed, the administrator (i.e., the user of the management server 10) can easily recognize that, in both the sub-tank model printer 100a and the CTG model printer 100c, the remaining ink amounts in the CTGs are comparatively large, and it is not yet necessary to replace the CTG. Consequently, the convenience of an administrator can be improved.

Further, in a case where the CTG remaining rate of the sub-tank model printer 100a is 20% or less and greater than 0%, the management server 10 displays the remaining amount OBJ 320a that has the slow-blinking manner and includes the low remaining amount mark 323a and, in a case where the CTG remaining rate of the CTG model printer 100c is 20% or less and greater than 0%, the management server 10 displays the remaining amount OBJ 320c that has the slow-blinking manner and includes the low remaining amount mark 323c (see case B of FIG. 11). Thus, when the remaining amount OBJs 320a, 323a having the same display manner are displayed, the administrator can easily recognize that, in both the sub-tank model printer 100a and the CTG model printer 100c, the remaining ink amounts in the CTGs are comparatively small. Consequently, the convenience of the administrator can be improved.

Further, in a case where the CTG remaining rate of the sub-tank model printer 100a is 0%, and further the tank remaining rate is greater than 0%, the management server 10 displays the remaining amount OBJ 320a that has the fast-blinking manner and includes the replace mark 324a and, in a case where the CTG remaining rate of the CTG model printer 100c is 0%, the management server 10 displays the remaining amount OBJ 320c that has the fast-blinking manner and includes the replace mark 324c (see case D of FIG. 13). Thus, when the remaining amount OBJs 320a, 320c having the same display manner are displayed, the administrator can easily recognize that the CTG should be replaced in both the sub-tank model printer 100a and the CTG model printer 100c. Consequently, the convenience of the administrator can be improved.

Further, in the present embodiment, the plurality of remaining amount OBJs 320a, 320b corresponding to the plurality of sub-tank model printers 100a, 100b, and the plurality of remaining amount OBJs 320c, 320d corresponding to the plurality of CTG model printers 100c, 100d are displayed in the management screen 300. Due to this, by displaying each remaining amount OBJ having the same display manner, the administrator can easily find the printers, from among the plurality of printers 100a to 100d, that have the same state related to the remaining ink amount.

(Correspondence Relationship)

The management server 10, the sub-tank model printer 100a, and the CTG model printer 100c are respectively an example of "an information processing device", "a first-type printer", and "a second-type printer". The print executing unit 160a, the sub-tank 175a, the CTG 200a, the print executing unit 160c, and the CTG 200c are respectively an example of "a first print executing unit", "a tank", "a first cartridge", "a second print executing unit", and "a second cartridge". Further, the printers 100a, 100b are an example of "a plurality of first-type printers", and the printers 100c, 100d are an example of "a plurality of second-type printers". The ink is an example of "colorant". The ink information 140a and the ink information 140c are respectively an example of "first remaining amount information" and "second remaining amount information". The tank remaining rate 0% in the sub-tank model printer 100a is an example of "an unprintable remaining amount". The CTG remaining rate 0% in the CTG model printer 100c is an example of the "unprintable remaining amount". The CTG remaining rate 20% is an example of "a first remaining amount" and "a second remaining amount".

The management screen 300 is an example of "a remaining amount screen". The remaining amount OBJ 320a and the remaining amount OBJ 320c are respectively an example of "a first remaining amount object" and "a second remaining amount object". The remaining amount OBJs 320a, 320b are an example of "a plurality of first remaining amount objects". The remaining amount OBJs 320c, 320d are an example of "a plurality of second remaining amount objects". The CTG OBJ 321a, the tank OBJ 322a, and the CTG OBJ 321c are respectively an example of "a first cartridge object", "a tank object", and "a second cartridge object". The replace mark and the low remaining amount mark are respectively an example of "a first mark object" and "a second mark object (or mark object)". In one aspect, the non-blinking manner is an example of "a first display manner". Further, in another aspect, the display manner not including the low remaining amount mark or the replace mark is an example of the "first display manner". In one aspect, the fast-blinking manner is an example of "a second display manner". Further, in another aspect, the display manner including the replace mark is an example of the "second display manner". In one aspect, the slow-blinking manner is an example of "a third display manner". Further, in another aspect, the display manner including the low remaining amount mark is an example of the "third display manner". The 0.5 second cycle and the one second cycle are respectively an example of "a first cycle" and "a second cycle (or a predetermined cycle)".

Further, the process of S12 of FIG. 6 is an example of "acquire first remaining amount information" and "acquire second remaining amount information." The process of S22 is an example of "display a remaining amount screen".

(Variant 1) The management server 10 may use a CTG remaining rate 20% in S320 and S330 of FIG. 9, and may use a CTG remaining rate 30% instead of the CTG remaining rate 20% in S324 and S334. In the present variant, the CTG remaining rate 20% and the CTG remaining rate 30% are respectively an example of the "first remaining amount" and the "second remaining amount". Generally speaking, the "first remaining amount" and the "second remaining amount" may be an identical value, or may be different values.

(Variant 2) The management server 10 may execute the process of FIG. 9 without using the CTG remaining rate and the tank remaining rate. For example, in S320, S324 the management server 10 may determine whether the number of remaining sheets is greater than a predetermined number of sheets. Here, in the sub-tank model printers 100a, etc., the predetermined number of sheets is a number of sheets greater than the number of tank sheets. In S330, the management server 10 may determine whether the number of remaining sheets is greater than the number of tank sheets and equal to or less than a predetermined number of sheets. In S334, the management server 10 may determine whether the number of remaining sheets is greater than zero and equal to or less than a predetermined number of sheets. In S340, the management server 10 may determine whether the number of remaining sheets is greater than zero and equal to or less than the number of tank sheets. In the present variant, the predetermined number of sheets is an example of the "first remaining amount" and the "second remaining amount". The number of remaining sheets being zero is an example of the "unprintable remaining amount".

(Variant 3) In S12 of FIG. 6, instead of acquiring the number of total sheets TO, the number of tank sheets TA, and the number of remaining sheets RE from each of the printers 100a, etc., the management server 10 may acquire, from each of the printers 100a, etc., other information related to the remaining ink amount in the printer. For example, each CTG mounted in the printer 100a, etc. may comprise a sensor configured to detect a liquid level in the CTG, and the ink remaining amount in the CTG (may be calculated based on this liquid level. Further, each of the sub-tank model printers 100a, etc. may comprise a sensor configured to detect a liquid level in the sub-tank 175a, and the ink remaining amount in the sub-tank 175a may be calculated based on this liquid level. In this case, the management server 10 acquires, from each of the sub-tank model printers 100a, etc., a total amount of ink stored in a new CTG (the unit is, e.g., cc, ml, cm³, etc), the ink remaining amount in the sub-tank 175a, and the ink remaining amount in the CTG. Further, the management server 10 acquires the total amount of ink stored in a new CTG and the ink remaining amount in the CTG from the CTG model printers 100c, etc. According to this configuration also, the management server 10 can calculate the CTG remaining rate and the tank remaining rate, and can execute processes using these remaining rates. Further, in another variant, each of the sub-tank model printers 100a, etc. may be able to calculate the CTG remaining rate and the tank remaining rate. Further, the CTG model printers 100c, etc. may be able to calculate the CTG remaining rate. In this case, the management server 10 acquires the CTG remaining rate and the tank remaining rate from each of the sub-tank model printers 100a, etc. Further, the management server 10 acquires the CTG remaining rate from the CTG model printer 100c. Generally speaking, the "first (or second) remaining amount information" may be any information related to the remaining amount of colorant in the first-type (or second-type) printer.

(Variant 4) The sub-tank model printers 100a, etc. may shift from the printable state to the unprintable state in a case where the tank remaining rate reaches a predetermined value greater than 0% (e.g., 5%). Further, the CTG model printers 100c, etc. may shift from the printable state to the unprintable state in a case where the CTG remaining rate reaches a predetermined value greater than 0% (e.g., 5%). In the present variant, the remaining amount in the case where the tank remaining rate or the CTG remaining rate is the aforementioned predetermined value is an example of the "unprintable remaining amount". The unprintable remaining amounts of the first-type and the second-type printer may be the same remaining amount, or may be different remaining amounts.

(Variant 5) The management server 10 may not determine to display using the blinking manners in S332. S342. S352 of FIG. 9, but may determine only to display the low remaining amount mark or the replace mark. In the present variant, a display manner not including the low remaining amount mark or the replace mark, a display manner including the replace mark, and a display manner including the low remaining amount mark are respectively an example of the "first display manner", the "second display manner", and the "third display manner".

(Variant 6) The management server 10 may not determine to display the low remaining amount mark or the replace mark in S332. S342. S352 of FIG. 9, but may determine only to display using the slow-blinking manner or the fast-blinking manner. In the present variant, a display manner having the non-blinking manner, the display manner having the fast-blinking manner, and a display manner including the slow-blinking manner are respectively an example of the "first display manner", the "second display manner", and the "third display manner".

(Variant 7) The management server 10 may determine to display all the OBJs in the non-blinking manner in S332 of FIG. 9, as in S322. In the present variant, the "third display manner" can be omitted.

(Variant 8) The management server 10 may determine to display the CTG OBJ in the slow-blinking manner, and the low remaining amount mark in S342 or S352 of FIG. 9, as in S332. In the present variant, the "second display manner" can be omitted.

(Variant 9) The CTG OBJs 321a, etc. and the tank OBJs 322a, etc. may each not have a band shape extending linearly along the left-right direction, but may have a band shape extending linearly along the vertical direction. Further, the CTG OBJs 321a, etc. and the tank OBJs 322a, etc. may each not have a band shape extending linearly, but may have a band shape that is curved. As a reference example, the CTG OBJs 321a, etc. and the tank OBJs 322a, etc. may each not have a band shape. For example, a CTG OBJ which is a character string indicating the CTG remaining rate and a tank OBJ which is a character string indicating the tank remaining rate may be displayed. In this case, each display manner may be realized by displaying these character strings in a blinking manner, or by additionally displaying the replace mark or the low remaining amount mark in these character strings.

(Variant 10) Each of the printers 100a to 100d may comprise a color printing mechanism (e.g., a printing mechanism using four colors CMYK) instead of the monochrome printing mechanism. In this case, in S12 of FIG. 6 the management server 10 may acquire pieces of information corresponding to the respective colors (i.e., the number of total sheets, the number of tank sheets, and the number of remaining sheets), and display remaining amount OBJs corresponding to the respective colors by using the pieces of information corresponding to the colors. In particular, in this case, each remaining amount OBJ may include a frame having a corresponding color, and a remaining area having the corresponding color. According to this configuration, the administrator can easily recognize which remaining amount OBJ is related to the remaining ink amount of which color.

(Variant 11) Each of the printers 100a to 100d may comprise a laser scheme printing mechanism instead of the ink jet scheme printing mechanism. In this case, a toner cartridge configured to store toner is mounted in each of the printers 100*a* to 100*d*. The sub-tank model printers 100*a*, etc. each comprises a sub-tank configured to store toner supplied from the toner cartridge to the print executing unit. In the present variant, the toner is an example of the "colorant".

(Variant 12) In each of the above embodiments, the respective processes of FIG. 6 to FIG. 9 are implemented by software (i.e., the management application 38). However, one or more of the processes may be implemented by hardware such as a logic circuit.

What is claimed is:

1. A non-transitory computer-readable recording medium storing computer-readable instructions for an information processing device,
    wherein the computer-readable instructions, when executed by a processor of the information processing device, cause the information processing device to:
    acquire first remaining amount information related to a remaining amount of colorant in a first-type printer from the first-type printer, wherein the first-type printer comprises a first print executing unit and a tank configured to store colorant supplied from a first cartridge to the first print executing unit;
    acquire second remaining amount information related to a remaining amount of colorant in a second-type printer from the second-type printer different from the first-type printer, wherein the second-type printer comprises a second print executing unit and does not comprise a tank configured to store colorant supplied from a second cartridge to the second print executing unit, and each of the first-type printer and the second-type printer shifts from a printable state to an unprintable state in a case where the remaining amount of colorant in the printer reaches an unprintable remaining amount; and
    display a remaining amount screen on a display unit of the information processing device using the acquired first remaining amount information and the acquired second remaining amount information, wherein the remaining amount screen includes a first remaining amount object which indicates the remaining amount of colorant in the first-type printer, and a second remaining amount object which indicates the remaining amount of colorant in the second-type printer,
    wherein the first remaining amount object includes a first cartridge object having a band shape which indicates a remaining amount of colorant in the first cartridge, and a tank object having a band shape which indicates a remaining amount of colorant in the tank,
    the second remaining amount object includes a second cartridge object having a band shape which indicates a remaining amount of colorant in the second cartridge,
    the first remaining amount object having a first display manner is displayed in a case where the acquired first remaining amount information indicates that the remaining amount of colorant in the first cartridge is greater than zero,
    the first remaining amount object having a second display manner different from the first display manner is displayed in a case where the acquired first remaining amount information indicates that the remaining amount of colorant in the first cartridge is zero and the remaining amount of colorant in the tank is greater than the unprintable remaining amount,
    the second remaining amount object having the first display manner is displayed in a case where the acquired second remaining amount information indicates that the remaining amount of colorant in the second cartridge is greater than the unprintable remaining amount, and
    the second remaining amount object having the second display manner is displayed in a case where the acquired second remaining amount information indicates that the remaining amount of colorant in the second cartridge is the unprintable remaining amount.

2. The non-transitory computer-readable recording medium as in claim 1, wherein
    the first remaining amount object having the first display manner includes the first cartridge object being in a non-blinking state and the tank object being in a non-blinking state,
    the first remaining amount object having the second display manner includes the first cartridge object being in a first blinking state of blinking on a first cycle,
    the second remaining amount object having the first display manner includes the second cartridge object being in a non-blinking state, and
    the second remaining amount object having the second display manner includes the second cartridge object being in the first blinking state of blinking on the first cycle.

3. The non-transitory computer-readable recording medium as in claim 2, wherein
    the first remaining amount object having the second display manner includes the tank object being in a non-blinking state in a case where the acquired first remaining amount information indicates that the remaining amount of colorant in the first cartridge is zero and the remaining amount of colorant in the tank is greater than zero.

4. The non-transitory computer-readable recording medium as in claim 3, wherein
    the first remaining amount object having the second display manner is displayed in a case where the acquired first remaining amount information indicates that the remaining amount of colorant in the first cartridge is zero and the remaining amount of colorant in the tank is the unprintable remaining amount, and
    the first remaining amount object having the second display manner includes the tank object being in the first blinking state of blinking on the first cycle in the case where the acquired first remaining amount information indicates that the remaining amount of colorant in the first cartridge is zero and the remaining amount of colorant in the tank is the unprintable remaining amount.

5. The non-transitory computer-readable recording medium as in claim 2, wherein
    a blinking timing of the first remaining amount object being in the first blinking state and a blinking timing of the second remaining amount object being in the first blinking state synchronize with each other.

6. The non-transitory computer-readable recording medium as in claim 1, wherein
    the first remaining amount object having the first display manner does not include a first mark object indicating that a cartridge can be replaced,
    the first remaining amount object having the second display manner includes the first mark object,
    the second remaining amount object having the first display manner does not include the first mark object, and
    the second remaining amount object having the second display manner includes the first mark object.

7. The non-transitory computer-readable recording medium as in claim 1, wherein
the first remaining amount object having the first display manner is displayed in a case where the acquired first remaining amount information indicates that the remaining amount of colorant in the first cartridge is greater than a first remaining amount,
the second remaining amount object having the first display manner is displayed in a case where the acquired second remaining amount information indicates that the remaining amount of colorant in the second cartridge is greater than a second remaining amount,
the first remaining amount object having a third display manner different from both the first display manner and the second display manner is displayed in a case where the acquired first remaining amount information indicates that the remaining amount of colorant in the first cartridge is equal to or less than the first remaining amount and is greater than zero, and
the second remaining amount object having the third display manner is displayed in a case where the acquired second remaining amount information indicates that the remaining amount of colorant in the second cartridge is equal to or less than the second remaining amount and is greater than the unprintable remaining amount.

8. The non-transitory computer-readable recording medium as in claim 7, wherein
the first remaining amount object having the first display manner includes the first cartridge object being in a non-blinking state and the tank object being in a non-blinking state,
the first remaining amount object having the second display manner includes the first cartridge object being in a first blinking state of blinking on a first cycle,
the first remaining amount object having the third display manner includes the first cartridge object being in a second blinking state of blinking on a second cycle that is longer than the first cycle,
the second remaining amount object having the first display manner includes the second cartridge object being in a non-blinking state,
the second remaining amount object having the second display manner includes the second cartridge object being in the first blinking state of blinking on the first cycle, and
the second remaining amount object having the third display manner includes the second cartridge object being in the second blinking state of blinking on the second cycle.

9. The non-transitory computer-readable recording medium as in claim 8, wherein
the first remaining amount object having the third display manner includes the tank object being in a non-blinking state.

10. The non-transitory computer-readable recording medium as in claim 7, wherein
the first remaining amount object having the first display manner includes neither a first mark object indicating that a cartridge can be replaced nor a second mark object indicating that a remaining amount of colorant in a cartridge is low,
the first remaining amount object having the second display manner includes the first mark object and does not include the second mark object,
the first remaining amount object having the third display manner includes the second mark object and does not include the first mark object,
the second remaining amount object having the first display manner includes neither the first mark object nor the second mark object,
the second remaining amount object having the second display manner includes the first mark object and does not include the second mark object, and
the second remaining amount object having the third display manner includes the second mark object and does not include the first mark object.

11. The non-transitory computer-readable recording medium as in claim 1, wherein
from each of a plurality of first-type printers, a piece of the first remaining amount information related to the remaining amount of colorant in the first-type printer is acquired,
from each of a plurality of second-type printers, a piece of the second remaining amount information related to the remaining amount of colorant in the second-type printer is acquired,
the remaining amount screen is displayed on the display unit by using the acquired plural pieces of the first remaining amount information and the acquired plural pieces of the second remaining amount information, and
the remaining amount screen includes a plurality of the first remaining amount objects corresponding to the plurality of first-type printers and a plurality of the second remaining amount objects corresponding to the plurality of second-type printers.

12. A non-transitory computer-readable recording medium storing computer-readable instructions for an information processing device,
wherein the computer-readable instructions, when executed by a processor of the information processing device, cause the information processing device to:
acquire first remaining amount information related to a remaining amount of colorant in a first-type printer from the first-type printer, wherein the first-type printer comprises a first print executing unit and a tank configured to store colorant supplied from a first cartridge to the first print executing unit;
acquire second remaining amount information related to a remaining amount of colorant in a second-type printer from the second-type printer different from the first-type printer, wherein the second-type printer comprises a second print executing unit and does not comprise a tank configured to store colorant supplied from a second cartridge to the second print executing unit, and each of the first-type printer and the second-type printer shifts from a printable state to an unprintable state in a case where the remaining amount of colorant in the printer reaches an unprintable remaining amount; and
display a remaining amount screen on a display unit of the information processing device using the acquired first remaining amount information and the acquired second remaining amount information, wherein the remaining amount screen includes a first remaining amount object which indicates the remaining amount of colorant in the first-type printer, and a second remaining amount object which indicates the remaining amount of colorant in the second-type printer,
wherein the first remaining amount object includes a first cartridge object having a band shape which indicates a remaining amount of colorant in the first cartridge, and a tank object having a band shape which indicates a remaining amount of colorant in the tank, the second remaining amount object includes a second cartridge object having a band shape which indicates a remaining amount of colorant in the second cartridge, the first remaining amount object having a first display manner is displayed in a case where the acquired first remaining amount information indicates that the remaining amount of colorant in the first cartridge is greater than a first remaining amount, the first remaining amount object having a third display manner different from the first display manner is displayed in a case where the acquired first remaining amount information indicates that the remaining amount of colorant in the first cartridge is equal to or less than the first remaining amount and is greater than zero, the second remaining amount object having the first display manner is displayed in a case where the acquired second remaining amount information indicates that the remaining amount of colorant in the second cartridge is greater than a second remaining amount, and the second remaining amount object having the third display manner is displayed in a case where the acquired second remaining amount information indicates that the remaining amount of colorant in the second cartridge is equal to or less than the second remaining amount and is greater than the unprintable remaining amount.

13. The non-transitory computer-readable recording medium as in claim 12, wherein the first remaining amount object having the first display manner includes the first cartridge object being in a non-blinking state and the tank object being in a non-blinking state, the first remaining amount object having the third display manner includes the first cartridge object being in a blinking state of blinking on a predetermined cycle, the second remaining amount object having the first display manner includes the second cartridge object being in a non-blinking state, and the second remaining amount object having the third display manner includes the second cartridge object being in the blinking state of blinking on the predetermined cycle.

14. The non-transitory computer-readable recording medium as in claim 12, wherein the first remaining amount object having the first display manner does not include a mark object indicating that a remaining amount of colorant in a cartridge is low, the first remaining amount object having the third display manner includes the mark object, the second remaining amount object having the first display manner does not include the mark object, and the second remaining amount object having the third display manner includes the mark object.

15. The non-transitory computer-readable recording medium as in claim 12, wherein from each of a plurality of first-type printers, a piece of the first remaining amount information related to the remaining amount of colorant in the first-type printer is acquired, from each of a plurality of second-type printers, a piece of the second remaining amount information related to the remaining amount of colorant in the second-type printer is acquired, the remaining amount screen is displayed on the display unit by using the acquired plural pieces of the first remaining amount information and the acquired plural pieces of the second remaining amount information, and the remaining amount screen includes a plurality of the first remaining amount objects corresponding to the plurality of first-type printers and a plurality of the second remaining amount objects corresponding to the plurality of second-type printers.

16. An information processing device comprising:

a processor; and a memory storing computer-readable instructions therein, wherein the computer-readable instructions, when executed by the processor, cause the information processing device to:

acquire first remaining amount information related to a remaining amount of colorant in a first-type printer from the first-type printer, wherein the first-type printer comprises a first print executing unit and a tank configured to store colorant supplied from a first cartridge to the first print executing unit;

acquire second remaining amount information related to a remaining amount of colorant in a second-type printer from the second-type printer different from the first-type printer, wherein the second-type printer comprises a second print executing unit and does not comprise a tank configured to store colorant supplied from a second cartridge to the second print executing unit, and each of the first-type printer and the second-type printer shifts from a printable state to an unprintable state in a case where the remaining amount of colorant in the printer reaches an unprintable remaining amount; and display a remaining amount screen on a display unit of the information processing device using the acquired first remaining amount information and the acquired second remaining amount information, wherein the remaining amount screen includes a first remaining amount object which indicates the remaining amount of colorant in the first-type printer, and a second remaining amount object which indicates the remaining amount of colorant in the second-type printer, wherein the first remaining amount object includes a first cartridge object having a band shape which indicates a remaining amount of colorant in the first cartridge, and a tank object having a band shape which indicates a remaining amount of colorant in the tank, the second remaining amount object includes a second cartridge object having a band shape which indicates a remaining amount of colorant in the second cartridge, the first remaining amount object having a first display manner is displayed in a case where the acquired first remaining amount information indicates that the remaining amount of colorant in the first cartridge is greater than zero, the first remaining amount object having a second display manner different from the first display manner is displayed in a case where the acquired first remaining amount information indicates that the remaining amount of colorant in the first cartridge is zero and the remaining amount of colorant in the tank is greater than the unprintable remaining amount, the second remaining amount object having the first display manner is displayed in a case where the acquired second remaining amount information indicates that the remaining amount of colorant in the second cartridge is greater than the unprintable remaining amount, and the second remaining amount object having the second display manner is displayed in a case where the acquired second remaining amount information indicates that the remaining amount of colorant in the second cartridge is the unprintable remaining amount.

17. The information processing device as in claim 16, wherein the first remaining amount object having the first display manner includes the first cartridge object being in a non-blinking state and the tank object being in a non-blinking state, the first remaining amount object having the second display manner includes the first cartridge object being in a first blinking state of blinking on a first cycle, the second remaining amount object having the first display manner includes the second cartridge object being in a non-blinking state, and the second remaining amount object having the second display manner includes the second cartridge object being in the first blinking state of blinking on the first cycle.

18. The information processing device as in claim 17, wherein the first remaining amount object having the second display manner includes the tank object being in a non-blinking state in a case where the acquired first remaining amount information indicates that the remaining amount of colorant in the first cartridge is zero and the remaining amount of colorant in the tank is greater than zero.

19. The information processing device as in claim 18, wherein the first remaining amount object having the second display manner is displayed in a case where the acquired first remaining amount information indicates that the remaining amount of colorant in the first cartridge is zero and the remaining amount of colorant in the tank is the unprintable remaining amount, and the first remaining amount object having the second display manner includes the tank object being in the first blinking state of blinking on the first cycle in the case where the acquired first remaining amount information indicates that the remaining amount of colorant in the first cartridge is zero and the remaining amount of colorant in the tank is the unprintable remaining amount.

20. The information processing device as in claim 17, wherein a blinking timing of the first remaining amount object being in the first blinking state and a blinking timing of the second remaining amount object being in the first blinking state synchronize with each other.

* * * * *